(12) United States Patent
Yoshida

(10) Patent No.: US 8,445,977 B2
(45) Date of Patent: May 21, 2013

(54) VIBRATION TRANSDUCER

(75) Inventor: Takashi Yoshida, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 13/422,466

(22) Filed: Mar. 16, 2012

(65) Prior Publication Data

US 2012/0235257 A1  Sep. 20, 2012

(30) Foreign Application Priority Data

Mar. 18, 2011 (JP) .................. 2011-060683

(51) Int. Cl.
*H01L 29/84* (2006.01)

(52) U.S. Cl.
USPC ............... 257/416; 257/418; 257/E21.214; 438/48

(58) Field of Classification Search
USPC .............. 438/195; 257/420, 507, E21.532, 257/E21.533, E21.534, E21.536
See application file for complete search history.

(56) References Cited

U.S. PATENT DOCUMENTS 8,222,065 B1 * 7/2012 Smeys et al. .................. 438/51

FOREIGN PATENT DOCUMENTS

JP  2005037309 A  2/2005

* cited by examiner

*Primary Examiner* — Cheung Lee
(74) *Attorney, Agent, or Firm* — Sughrue Mion, PLLC

(57) ABSTRACT

Vibration beams are provided on a substrate in parallel with the substrate and in parallel with each other, and provided in vacuum chambers formed by a shell and the substrate. Each of vibration beams has a sectional shape with a longer sectional thickness in a direction perpendicular to a surface of the substrate than a sectional thickness in a direction parallel to the surface of the substrate. A first electrode plate is provided in parallel with the surface of the substrate and connected to one end of each of the vibration beams. A second electrode plate is provided in parallel with the surface of the substrate and between the vibration beams. Third and fourth electrode plates are provided on opposite sides of the vibration beams. Asperities are provided in opposed side wall portion surfaces of the vibration beams and the second, third and fourth electrode plates.

7 Claims, 40 Drawing Sheets

VIBRATION TRANSDUCER

TECHNICAL FIELD

The present invention relates to a vibration transducer.

RELATED ART

FIGS. 29 to 38 are views for explaining a configuration of a main portion of a related-art example which has been heretofore generally used.

FIG. 29 is a view for explaining the assembled configuration of the main portion. FIGS. 30 to 38 are views for explaining a process for manufacturing the same.

Description will be made along the manufacturing process.

In FIG. 30, a silicon oxide film 10a is formed and patterned on an N-type silicon single crystal substrate 1.

A portion where the oxide film has been removed is undercut to form a recess portion and selective epitaxial growth of p-type silicon doped with boron whose concentration is $10^{18}$ $cm^{-3}$ is performed to grow a $p^+$ single crystal silicon layer 11.

Next, a $p^{++}$ single crystal silicon layer 12a is formed out of p-type silicon doped with boron whose concentration is at least $3\times10^{19}$ $cm^{-3}$, so as to fill the recess portion and grow further upward than the recess portion.

Afterwards, the $p^+$ single crystal silicon layer will become a gap under a vibration beam and the $p^{++}$ single crystal silicon layer will become the vibration beam. In FIG. 31, a silicon oxide film 10b is formed and patterned on the substrate surface including on the $p^{++}$ single crystal silicon layer 12a.

The portion designated by a recess portion D where the oxide film has been eliminated is a portion where a shell will be grounded to the substrate.

In FIG. 32, a silicon nitride film 13 is formed and patterned on the substrate surface including the recess portion D. The silicon oxide film 10b and the silicon nitride film 13 on the $p^{++}$ single crystal silicon layer 12a (vibration beam) will be a gap above the vibration beam. The electrostatic capacity depends on the thicknesses of those films and the area of the vibration beam. Therefore, when these values are adjusted to obtain a desired electrostatic capacity, the electrostatic capacity for driving and detecting the vibration beam can be optimized. In FIG. 33, a $p^{++}$ polysilicon layer 14 is formed on the whole surface and patterned to form an etchant introduction hole E for etching a sacrifice layer.

Afterwards, this $p^{++}$ polysilicon layer will be wiring for extracting a shell and electrodes.

The wiring may be formed by using $p^{++}/p^+$ single crystal silicon or by diffusing impurities into the silicon substrate before selective epitaxial growth.

It is better that such selection is made to minimize a parasitic capacitance between the wiring and the silicon substrate.

In FIG. 34, hydrofluoric acid is poured through the etchant introduction hole E to eliminate the silicon nitride film 13 and the silicon oxide film 10b.

In the portion where the shell will be grounded to the substrate, the etching speed of the silicon nitride film 13 is slow so that the silicon nitride film becomes an etching stop layer in a transversal direction.

In FIG. 35, the $p^+$ single crystal silicon layer 11 is eliminated by an alkaline solution (such as hydrazine, KOH or TMAH).

On this occasion, the $p^{++}$ single crystal silicon layer 12a and the $p^{++}$ polysilicon layer 14 are not etched because impurities are introduced thereto with high concentration.

In addition, when a voltage of 1 to 2 V is applied to the N-type silicon substrate during etching with the alkaline solution, the N-type silicon substrate can be protected from being etched.

Etching in the length direction of the vibration beam is stopped by use of the fact that the etching speed is slow in the <111> direction of the silicon single crystal.

In FIG. 36, a sealing member 15 (e.g. $SiO_2$ formed by sputtering, glass, or the like) is formed by sputtering, deposition, CVD, epitaxial growth, or the like, so as to fill the etchant introduction hole while forming a microscopic vacuum chamber 5.

Before this step, electric insulation between the shell and the vibration beam may be made more stable, for example, in such a manner that a silicon oxide film is formed on the surface of the vibration beam and inside the vacuum chamber by thermal oxidation or the like.

In this case, a conductive material may be used as the sealing member.

In FIG. 37, the $p^{++}$ polysilicon layer 14 is patterned so that electric wiring from the vibration beam and the shell is formed while electrodes for bonding pads are formed.

In FIG. 38, the silicon substrate is thinned on its rear side to form a diaphragm.

FIG. 39A is a plan view showing a state where the $p^{++}$ polysilicon layer 14 is patterned to form electric wiring 20 connected to the vibration beam 12a and the shell 14 while Al electrodes 21 for bonding are formed.

FIG. 39B shows a circuit diagram of a vibration transducer according to the related art.

In FIG. 39B, Vb designates a bias voltage (constant voltage), Vi designates a driving voltage (AC), each of R1 and R2 designates a wiring resistance, and R3 designates a substrate resistance.

C1 designates a capacitance between the vibration beam and the shell, C2 designates a parasitic capacitance, and each of C3 and C4 designates a capacitance between the wiring and the substrate. In FIG. 39B, a noise current can be reduced with decrease of the values R3, C2, C3 and C4.

In addition, these values are determined based on the wiring forming method, the patterning, etc. Accordingly, these values are determined to be as small as possible.

In FIG. 39B, when the capacitance C1 between the vibration beam and the shell is constant, the amplitude of an output current is proportional to $(C1+C2)\cdot Vi\cdot\omega$ in which $\omega$ designates the frequency of Vi.

On the other hand, when the capacitance C1 resonates with the frequency $\omega$, a current whose amplitude is approximately proportional to $\Delta C1\cdot Vb\cdot\omega$ in which $\Delta C1$ designates a variation of C1 caused by the resonation is added. The resonation frequency is detected based on the increase of the current.

[Prior Art Document]
[Patent Document]

[Patent Document 1] JP-A-2005037309

In such a device, there are problems as follows.

The related-art example of FIG. 29 has a lamination structure in which the vibration beam vibrates perpendicularly to the substrate, and the vibration beam, an excitation electrode and a vibration detection electrode are built into layers. Therefore, a large number of processing steps are required in the manufacturing process. This is because an electrode for exciting a vibrator and an electrode for detecting vibration have to be produced in the vacuum chamber in addition to the vibration beam and the electrodes have to be insulated from each other in a structure using an electrostatic force so that the structure becomes complicated inevitably.

In the lamination structure, the vibration beam and an opposed electrode are opposed to each other vertically. It is therefore necessary to provide separate processing steps for the vibration beam and the opposed electrode respectively. Accordingly, when a vibration transducer having a lamination structure is manufactured using micromachine technology, the number of masks increases, and the number of processing steps increases correspondingly. Thus, the lead time is elongated to result in increase in the cost. In addition, when the number of processing steps increases, the characteristic deteriorates due to accumulation of variation of processing accuracy. This is a primary factor for causing decrease in the yield.

Further, when an electrostatic force is used, the distances among the vibration beam, the driving electrode and the detection electrode must be normally set from submicron order to about 1 μm. However, to increase the frequency change rate (gauge factor) on strain in the vibration transducer, it is necessary to increase the length l of the vibration beam and decrease the thickness t thereof. Thus, there is a problem that the vibration beam may adhere to the electrodes and lose its operation.

This problem may occur during operation after manufacturing as well as due to adhesion of moisture during manufacturing.

The following relational expression is established between the resonance frequency of the vibration beam and the strain.

$$f = \alpha \frac{t}{l^2} \sqrt{1 + \beta \left(\frac{l}{t}\right)^2 \varepsilon_x + \gamma \frac{l^4}{h^3 t^3} V_b^2} \quad \text{[Formula 1]}$$

$\alpha, \beta, \gamma$: proportionality constants ($\alpha, \beta > 0, \gamma < 0$)
$V_b$: bias voltage for inducing electrostatic attractive force
t: thickness of vibration beam
l: length of vibration beam
$\varepsilon_s$: tensile strain of vibration beam
h: distance between vibration beam and opposed surface From the aforementioned expression, there is a linear relationship between the square of the frequency and the strain. Accordingly, the change rate (squared gauge factor $Gf^2$) of the square of the frequency on the strain at the bias voltage $V_b = 0V$ can be expressed as follows.

$$Gf^2 = \left(\frac{\delta f^2}{f^2}\right) \div \delta \varepsilon = \left(\frac{\frac{\partial f^2}{\partial \varepsilon}}{f^2}\right) = \frac{1}{\frac{1}{\beta\left(\frac{l}{t}\right)^2} + \varepsilon_x} \quad \text{[Formula 2]}$$

$Gf^2$: change rate of square of resonance frequency in response to variation $\delta_\varepsilon$ on strain of vibration beam
t: thickness of vibration beam
l: length of vibration beam
$\varepsilon_s$: tensile strain of vibration beam FIG. 40 is a graph where the aforementioned expression is plotted. FIG. 40 shows the case the ratio l/t between the length l and the thickness t in the vibration beam is 200 and the case where the ratio l/t is 140 by way of example. When the tensile strain of the vibration beam is nearly 0 με, the relational expression of $\beta(l^2/t^2)$ is established between the change rate of the square of the frequency and the strain, and this value is depicted by the y-intercept in FIG. 40. When the tensile strain is nearly 0 its, the black-circle curve (ratio l/t=200) takes a value about twice as large as the value of the white-circle curve (ratio l/t=140).

This means that the squared gauge factor $Gf^2$ increases in a low tensile strain region when the length l of the vibration beam is long and the thickness t thereof is thin.

On the other hand, when the tensile strain of the vibration beam is comparatively large and reaches at least 350 με the relational expression between the change rate of the square of the frequency and the strain approaches $1/\varepsilon_s$ gradually and comes to a limit of string vibration. Thus, the squared gauge factor $Gf^2$ depends on the magnitude of the tensile strain $\varepsilon_s$ substantially regardless of the shape of the vibration beam, and decreases with the increase of the tensile strain.

From this result, it is desirable that the length of the vibration beam is increased, the thickness of the vibration beam is reduced, and the tensile strain of the vibration beam is comparatively reduced when a highly sensitive vibration transducer with high strain sensitivity is manufactured.

Further, when an electrostatic force is selected for the driving force for vibrating the vibration beam, the electrostatic force cannot act effectively unless the distance between the driving electrode and the vibration beam is narrowed to be about 1 μm.

On the other hand, such a vibration beam which is long in length, thin in thickness, low in tensile strain and narrow in distance from an opposed electrode is fated to adhere to the opposed electrode easily.

The following expression is useful for explaining this fate, $$Np = \left(\frac{128 \, Eh^2 t^3}{5\gamma_x l^4}\right)\left[1 + \frac{4\sigma_k l^2}{21Et^2} + \frac{256}{2205}\left(\frac{h}{l}\right)^2\right] \quad \text{[Formula 3]}$$

E: Young's modulus of silicon
$\sigma_R$: tensile stress of vibration beam
$r_3$: energy of adhesion
t: thickness of vibration beam
l: length of vibration beam
h: distance between vibration beam and opposed surface This expression is an expression used for determining adhesion of a both-ends supported beam, and Np is called a peel number. The vibration beam adheres when Np=1.

As is understood easily from this expression, only the first term needs to be considered when the tensile strain is low, but Np is reduced when the length l is increased. When the thickness t and the distance h from the electrode are reduced, Np is still reduced.

Thus, it is no exaggeration to say that whether the sensitivity of an electrostatically driven vibration transducer can be increased or not depends on how to solve the problem of adhesion.

SUMMARY

Exemplary embodiments of the present invention provide a vibration transducer which can solve the problem of adhesion.

More specifically, the exemplary embodiments of the present invention provide:
(1) a vibration transducer with a silicon single crystal beam, which can be manufactured inexpensively with high accuracy;
(2) a vibration transducer on which a countermeasure against adhesion of a vibration beam can be done easily, simply and effectively;

(3) a vibration transducer which is thicker longitudinally than transversally to suppress a torsional vibration mode so that mode crossing can be prevented in a wide frequency band and pressure can be measured in a wide dynamic range;

(4) a vibration transducer in which a tuning fork type structure is used to enhance the vibration stability of a vibrator to thereby suppress decrease in Q value of the vibrator caused by resonance in another member such as a diaphragm than a vibration beam, the decrease in Q value of the vibrator being a drawback of the vibration transducer; and (5) a vibration transducer which is longer vertically and shorter horizontally to narrow the width of a shell and increase the withstanding pressure of a vacuum chamber in spite of the thin shell serving as a pressure bulkhead, so that the strain sensitivity of a vibration beam can be improved and a diaphragm can be miniaturized while the withstanding pressure can be also increased.

A vibration transducer according to a first configuration of the invention, comprises:

a silicon single crystal substrate;

vibration beams provided on the silicon single crystal substrate;

a shell made of a silicon material, surrounding the vibration beams to keep a gap around the vibration beams, and forming vacuum chambers together with the substrate;

an exciting module configured to excite the vibration beams; and a vibration detection module configured to detect vibrations of the vibration beams;

wherein the vibration beams include first and second silicon single crystal vibration beams provided in the vacuum chambers, each of which has a sectional shape with a longer sectional thickness in a direction perpendicular to a surface of the substrate than a sectional thickness in a direction parallel to the surface of the substrate, and which are provided in parallel with the substrate and in parallel with each other, and wherein the vibration transducer further comprises:

a plate-like first electrode plate provided in parallel with the surface of the substrate and connected to one end of each of the first and second vibration beams;

a second electrode plate provided in parallel with the surface of the substrate and between the first and second vibration beams;

plate-like third and fourth electrode plates provided on opposite sides of the first and second vibration beams so that the first and second vibration beams are put between the third and fourth electrode plates, forming one plane in parallel with the surface of the substrate together with the first and second vibration beams and the first and second electrode plates; and asperities provided in opposed side wall portion surfaces of the vibration beams and the second, third and fourth electrode plates so as to prevent the vibrating beams from adhering to the second, third and fourth electrode plates.

A vibration transducer according to a second configuration of the invention is that in the vibration transducer according to the first configuration of the invention, each of the asperities is formed into a grid shape continuous horizontally and/or vertically with respect to the surface of the substrate.

A vibration transducer according to a third configuration of the invention is that in the vibration transducer according to the first or second configuration of the invention, the first electrode plate is used as a bias voltage electrode plate for the vibration beams and the second electrode plate is used as a vibration detection electrode plate for the vibration beams; and the third and fourth electrode plates are used as excitation electrode plates for exciting the vibration beams.

A vibration transducer according to a fourth configuration of the invention is that in the vibration transducer according to the first or second configuration of the invention, the first electrode plate is used as a bias voltage electrode plate for the vibration beams and the second electrode plate is used as an excitation electrode plate for exciting the vibration beams; and the third and fourth electrode plates are used as vibration detection electrode plates for detecting vibrations of the vibration beams.

A vibration transducer according to a fifth configuration of the invention is that in the vibration transducer according to the first or second configuration of the invention, one of the first and second electrode plates is used as an excitation electrode and a bias voltage electrode and the other is used as a vibration detection electrode.

A vibration transducer according to a sixth configuration of the invention is that the vibration transducer according to any one of the first to fourth configurations of the invention further comprises a guard electrode plate provided in one plane in parallel with the surface of the substrate excluding the first, second, third and fourth electrode plates so as to prevent crosstalk among respective electrodes.

A vibration transducer according to a seventh configuration of the invention is that in the vibration transducer according to any one of the first to sixth configurations of the invention, the vibration beams includes both-ends fixed beams.

According to the first configuration of the invention, there is the following effect.

The related-art example of FIG. 29 has a lamination structure in which a vibration beam, an excitation electrode and a vibration detection electrode are built into layers. Therefore, a large number of processing steps are required in a manufacturing process in the related-art example of FIG. 29. According to the first configuration, however, it is possible to obtain a vibration transducer in which each vibration beam, each excitation electrode and each vibration detection electrode can be manufactured in one step (one mask) because the vibration beam, the excitation electrode and the vibration detection electrode can be disposed substantially in one and the same plane.

In the lamination type according to the related-art example of FIG. 29, it is difficult to roughen the vibration beam or a surface opposed to the vibration beam as a countermeasure against adhesion of the vibration beam and perform processing on the vibration beam and the opposed surface in order to prevent the vibration beam from adhering to the opposed surface. According to the first configuration, however, in the horizontally vibrating type in which each vibration beam, each excitation electrode and each vibration detection electrode can be disposed in one and the same plane, opposite surfaces can be roughened in one and the same processing step when the vibration beam and an electrode surface opposed thereto are processed. It is therefore possible to obtain a vibration transducer in which the adhesion of the vibration beam can be prevented easily and surely.

The roughened surfaces are produced, for example, by use of scallops occurring due to etching used for processing side surfaces or by use of irregularities provided in a mask pattern for forming the vibration beams and the electrodes.

When the vibration beams are disposed oblongly, the width of the shell can be made narrower than that in the related-art example of FIG. 29. It is therefore possible to obtain a vibration transducer in which the withstanding pressure can be improved when the thickness of the shell is fixed.

To achieve the same withstanding pressure, the film thickness of the shell serving as a pressure bulkhead may be thin. In the lamination vibrating type according to the related-art example of FIG. 29, the driving electrode has to be built on the shell side. Therefore, when high pressure is applied, the shell may be deformed to change the distance between the electrode and the vibration beam. Thus, there is a fear that the frequency change characteristic may be nonlinear.

The aspect ratio of the shape of each vibration beam also affects the resonance frequencies of horizontal vibration and vertical vibration. When the resonance frequency of a vibration mode of a vibration beam used for measurement of pressure causes interference with the resonance frequency of another vibration mode, the resonance frequencies are locked in each other so that hysteresis occurs in frequency measurement. Thus, an error is generated. In order to avoid the error, a horizontal vibration mode used for measurement of the vibration beam must have the lowest frequency (primary mode), and a vertical vibration mode must be a high-order vibration mode.

As for the aspect ratio of the shape of the vibration beam, the length must be at least three times as long as the transversal width in order to achieve the aforementioned condition. It is also important to dispose the vibration beam oblongly in this manner in order to improve the measuring accuracy.

Further, the shape of the vibration beam can be processed desirably two-dimensionally. It is therefore possible to easily manufacture a vibration beam having a complicated shape or a vibration beam effective in enhancing the vibration stability.

Here, description will be made on a vibrator having a dual tuning fork structure in which vibration beam portions of two tuning forks are opposed to and coupled with each other.

In the dual tuning fork structure, two vibration beams vibrate horizontally with respect to a substrate and concurrently to be opposed to each other or to leave each other. Thus, forces generated by the vibrations of the vibration beams cancel each other so that the force transmitted to the substrate fixed to the vibration beams becomes smaller than the case where one vibration beam vibrates alone.

For this reason, the vibration energy hardly leaks from the fixed ends of the vibration beams toward the substrate. Thus, a Q value indicating the sharpness of vibration in each vibration beam increases.

In addition, when the vibration beams are manufactured above a diaphragm to form a pressure gauge, the resonance frequency of the diaphragm may agree with the resonance frequency of the vibration beams. In such a case, when the leakage of the vibration energy of the vibration beams is low, interference of the vibration beams with the diaphragm due to resonance phenomena is so small that it is possible to suppress the lock-in of the resonance frequency of the vibration beams or the variation of amplitude thereof.

According to the second configuration of the invention, there is the following effect.

Each asperity is formed into a grid shape continuous horizontally and/or vertically with respect to the surface of the substrate so that the contact area at the time of contact can be reduced. Thus, there is an effect that each vibration beam can be prevented from adhering to an electrode opposed thereto with a narrow gap. The length of the vibration beam is at least 100 times as long as the thickness of the vibration beam with respect to the vibrating direction of the vibration beam. Thus, it is possible to form a vibration beam with high strain sensitivity.

According to the third configuration of the invention, there is the following effect.

The first electrode plate is used as a bias voltage electrode plate for the vibration beams, the second electrode plate is used as a vibration detection electrode plate for the vibration beams, and the third and fourth electrode plates are used as excitation electrode plates for exciting the vibration beams. As a result, in a four-terminal device, a vibration beam and an electrode connected thereto serve as a guard electrode so that an excitation electrode and a detection electrode can be separated from each other. It is therefore possible to obtain a vibration transducer in which crosstalk of an excitation signal intruding into a detection circuit is suppressed so that the SN ratio is improved.

According to the fourth configuration of the invention, there is the following effect.

The first electrode plate is used as a bias voltage electrode plate for the vibration beams, the second electrode plate is used as an excitation electrode plate for exciting the vibration beams, and the third and fourth electrode plates are used as vibration detection electrode plates for detecting the vibrations of the vibration beams. Therefore, in a four-terminal device, a vibration beam and an electrode connected thereto serve as a guard electrode so that an excitation electrode and a detection electrode can be separated from each other. It is therefore possible to obtain a vibration transducer in which crosstalk of an excitation signal intruding into a detection circuit is suppressed so that the SN ratio is improved.

According to the fifth configuration of the invention, there is the following effect.

One of the first and second electrode plates is used as an excitation electrode and a bias voltage electrode and the other is used as a vibration detection electrode. Therefore, in the case where excitation and detection are performed by a two-terminal device, the number of lead terminals can be reduced, and the number of hermetic pins can be reduced in the two-terminal device. It is therefore possible to obtain a vibration transducer whose package can be miniaturized.

According to the sixth configuration of the invention, there is the following effect.

The guard electrode plate is provided in one plane in parallel with the surface of the substrate excluding the first, second, third and fourth electrode plates to surround these electrodes so as to prevent crosstalk among the respective electrodes. It is therefore possible to obtain a vibration transducer in which crosstalk can be further reduced when the guard electrode plate is grounded.

According to the seventh configuration of the invention, there is the following effect.

An individual vibration beam of a dual tuning fork type vibrator is a both-ends fixed beam. Accordingly, the vibrator can be self-excited in the both-ends fixed beam having the smallest number of vibration modes. In addition, when the longitudinal thickness of the sectional shape of the beam is thicker than the transversal thickness, a torsional vibration mode can be suppressed. Therefore, it is possible to obtain a vibration transducer in which mode crossing can be prevented in a range of measurement and the vibration beam can be used in a wide frequency band so that pressure can be measured in a wide dynamic range.

DETAILED DESCRIPTION

The invention will be described below in detail with reference to the drawings.

FIGS. 1A-1B and FIGS. 2 to 15 are diagrams for explaining a configuration of a main portion of an embodiment of the invention.

Figure 1A:
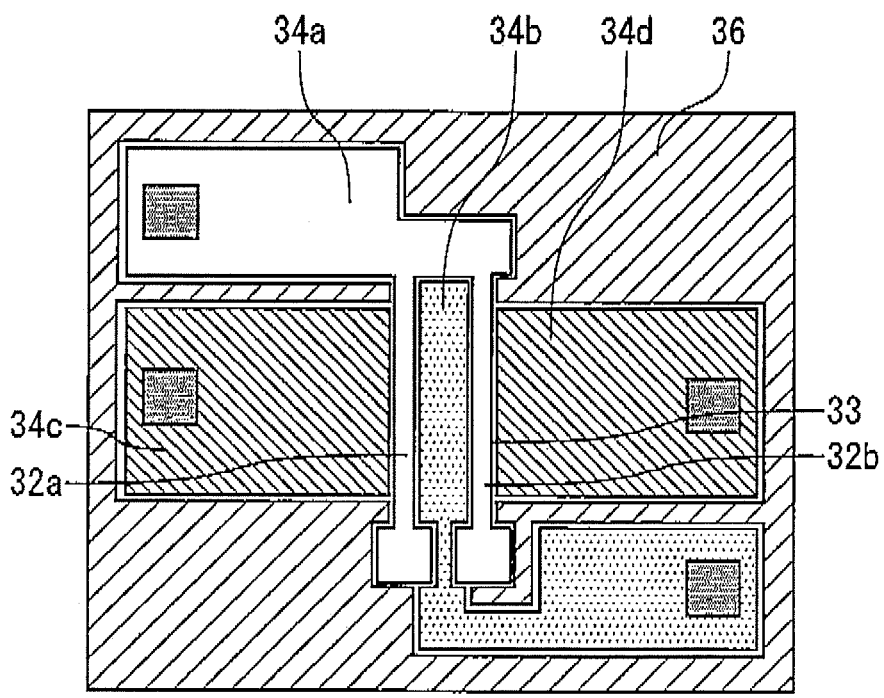
FIGS. 1A and 1B illustrate a main portion of a vibration transducer according to an embodiment of the invention.
Figure 1B:
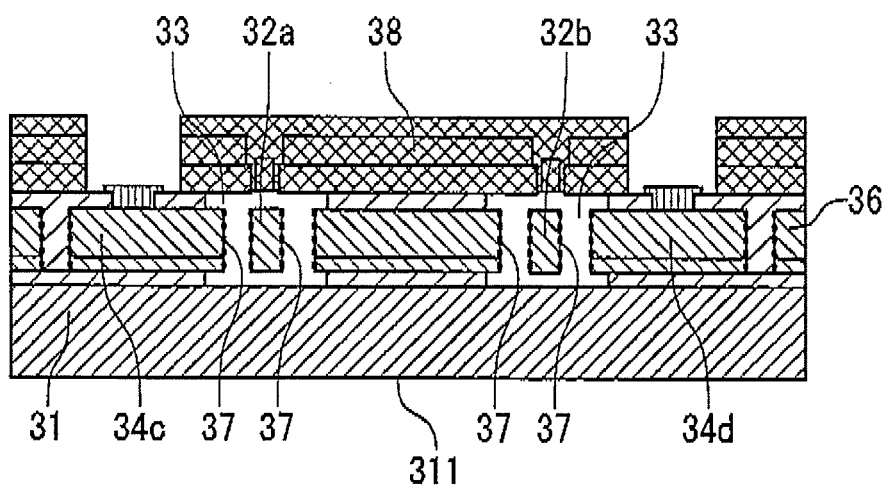

FIGS. 1A-1B are diagrams for explaining the assembled configuration of the main portion. FIG. 1A is a plan view of the main portion, and FIG. 1B is a sectional view thereof. FIGS. 2 to 15 are diagrams for explaining a manufacturing process.

Figure 29:
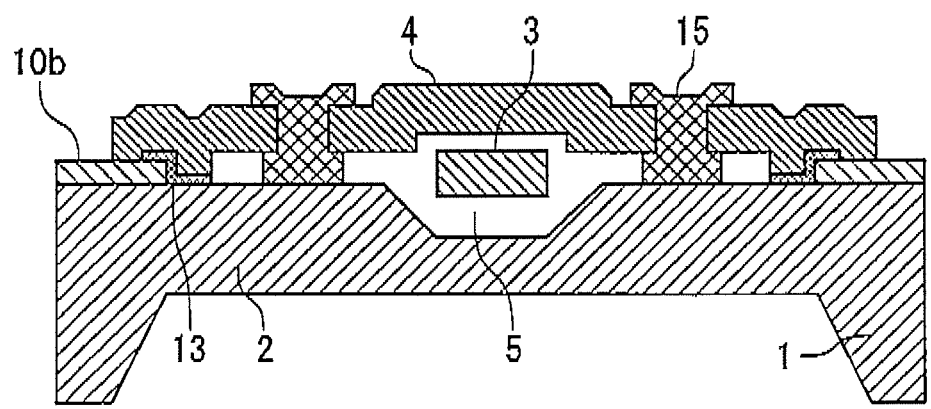
FIG. 29 illustrates a main portion of the related-art vibration transducer.
Figure 30:
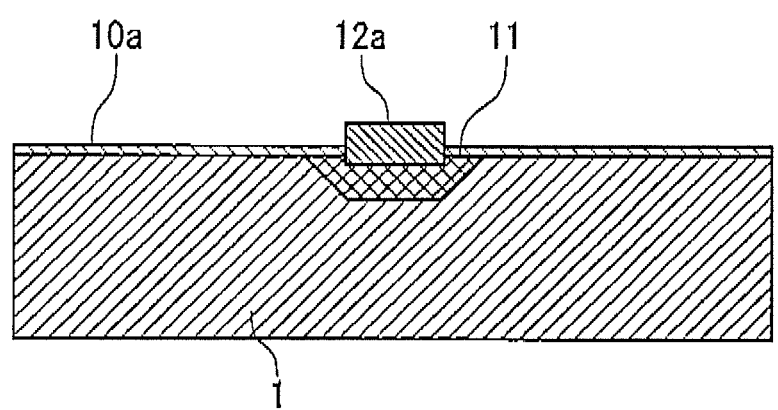
FIGS. 30-38 illustrate a manufacturing process of FIG. 29.
Figure 31:
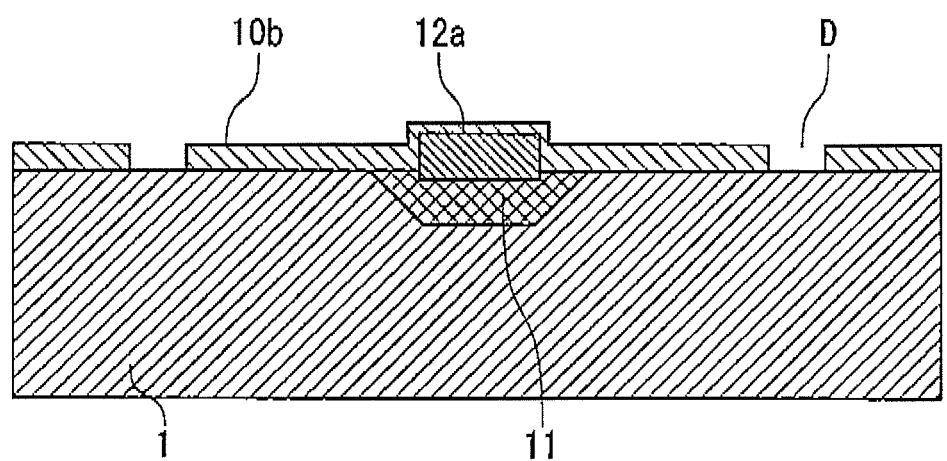
Figure 32:
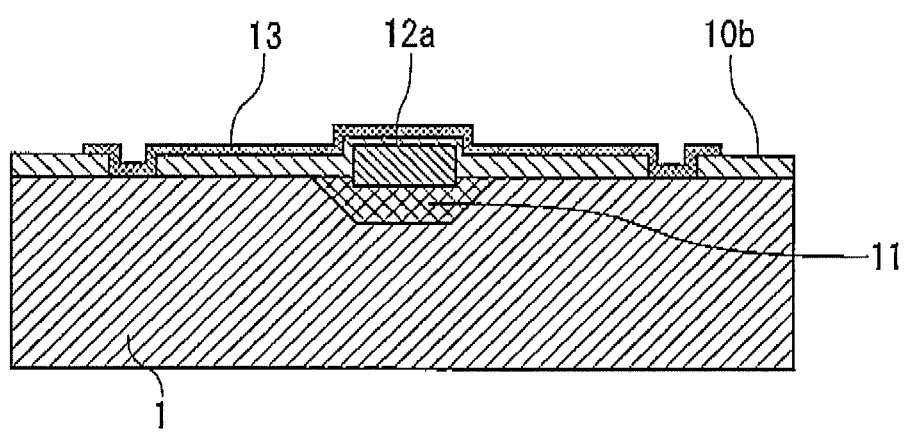
Figure 33:
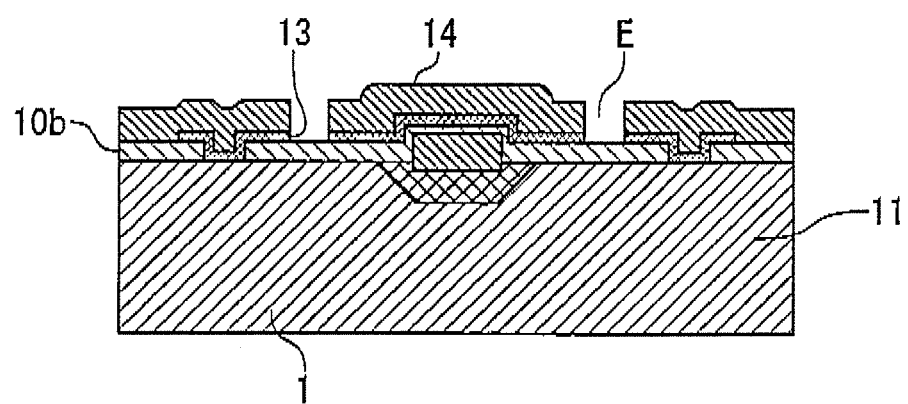
Figure 34:
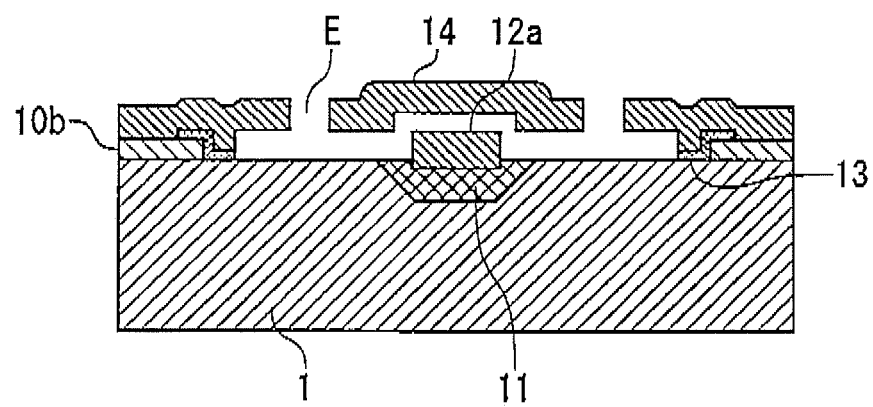
Figure 35:
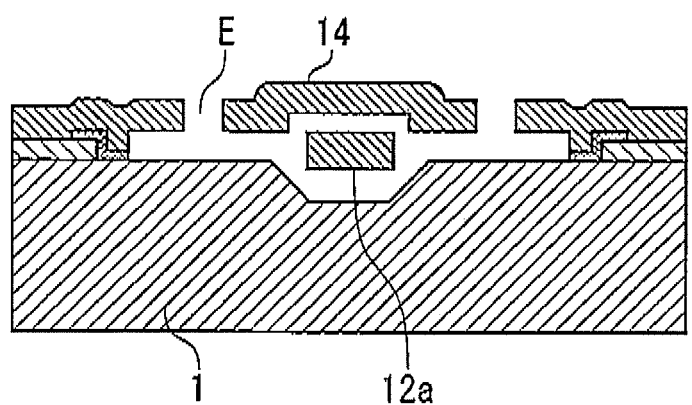
Figure 36:
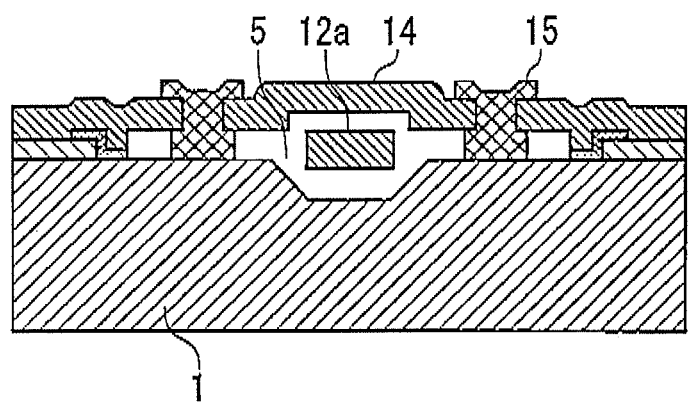
Figure 37:
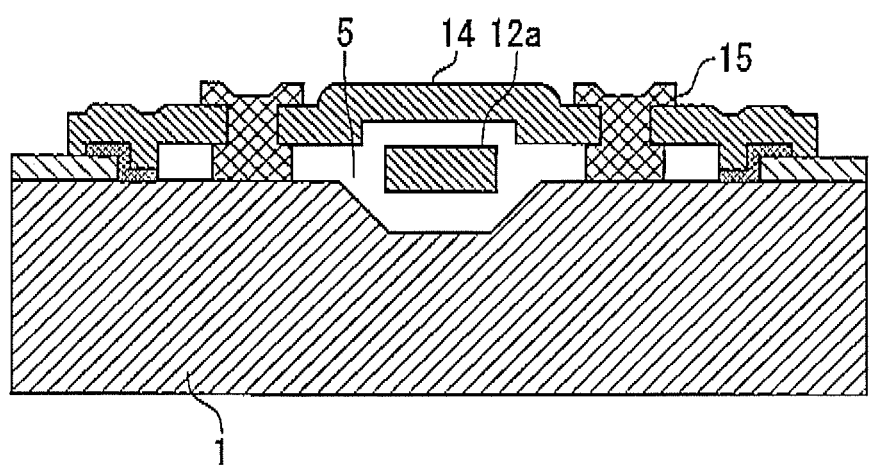
Figure 38:
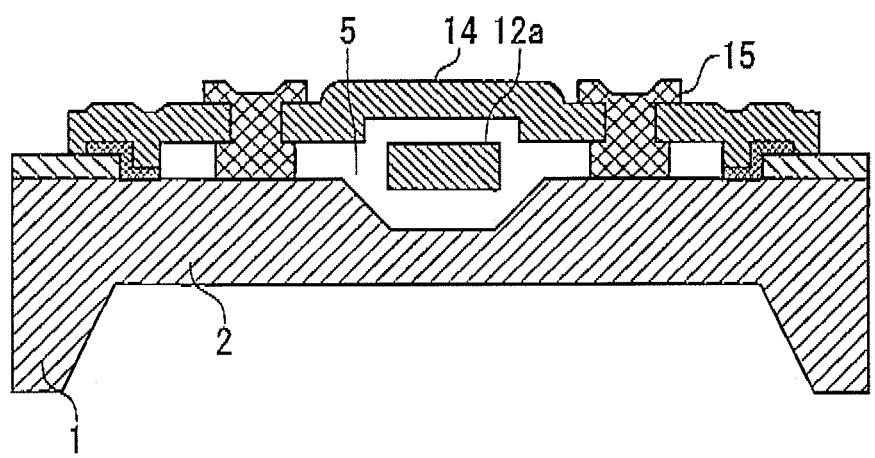
Figure 39A:
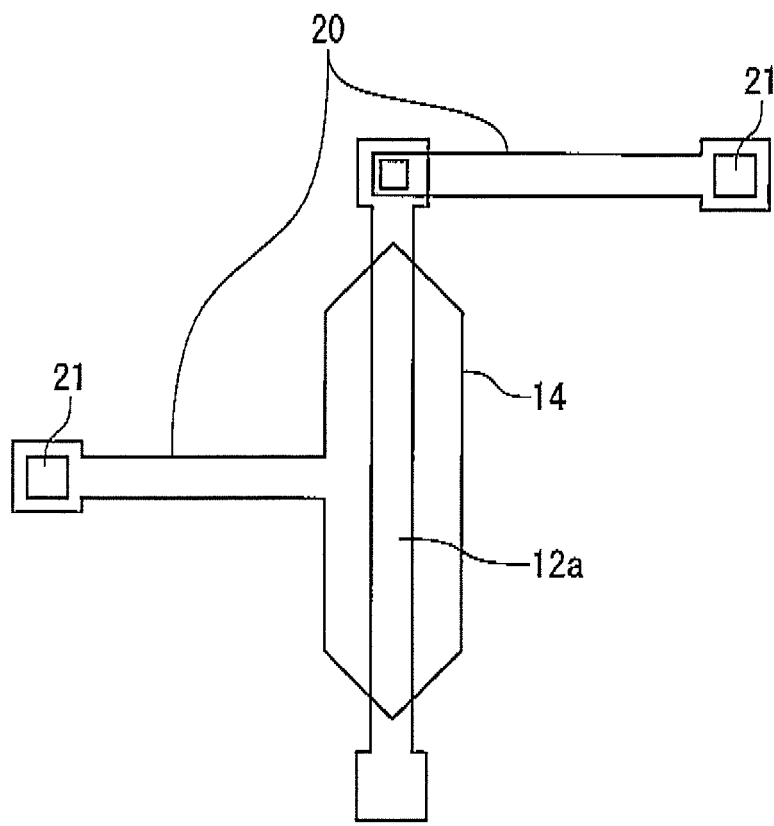
FIG. 39A is a plan view showing interconnections of the related-art vibration transducer.
Figure 39B:
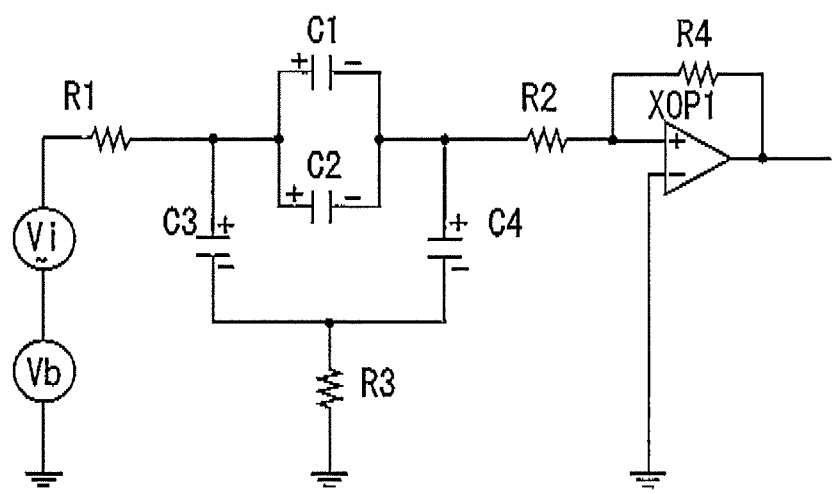
FIG. 39B is a circuit diagram of the related-art vibration transducer.
Figure 40:
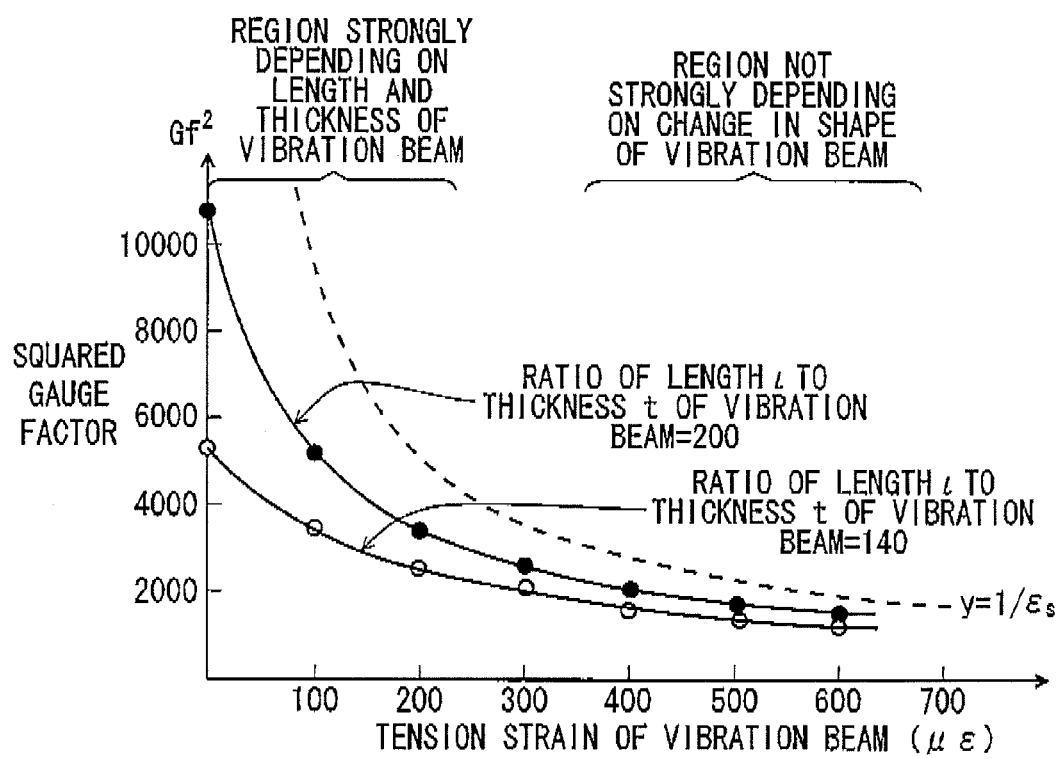
FIG. 40 is a graph corresponding to Formula 2.

In the drawings, constituents designated by the same numerals as those in FIG. 29 have the same functions correspondingly.

Only different parts from FIG. 29 will be described below.

In FIGS. 1A and 1B, each of first and second vibration beams 32a and 32b is provided in a vacuum chamber 33. Tensile stress is applied to the substrate 31 in these vibration beams. The first, second vibration beam 32a, 32b consists of vibration beam. The silicon single crystal has a sectional shape with a longer sectional thickness in a perpendicular direction to a surface 311 of a substrate 31 than a sectional thickness in a parallel direction to the surface 311.

A first electrode plate 34a is provided in parallel with the surface 311 of the substrate 31 and connected to one end of each of the first and second vibration beams 32a and 32b. The first electrode plate 34a has a plate-like shape.

A second electrode plate 34b is provided in parallel with the substrate surface 311 and between the first and second vibration beams 32a and 3211

Third and fourth electrode plates 34c and 34d are provided on opposite sides of the first and second vibration beams 32a and 32b so that the first and second vibration beams 32a and 32b are put between the third and fourth electrode plates 34c and 34d. In addition, the third and fourth electrode plates 34c and 34d together with the first and second vibration beams 32a and 32b and the first and second electrodes 34a and 34b form one plane in parallel with the substrate surface 311 and have a plate-like shape.

A guard electrode 36 is provided in parallel with the substrate surface 311 so as to surround the first and second vibration beams 32a and 32b, the first electrode plate 34a, the second electrode plate 34b, the third electrode plate 34c and the fourth electrode plate 34d with a gap, so that capacitive coupling can be reduced. The guard electrode 36 together with the first and second vibration beams 32a and 32b, the first electrode plate 34a, the second electrode plate 34b, the third electrode plate 34c and the fourth electrode plate 34d forms one plane in parallel with the substrate surface 311 and has a platelike shape.

Asperities 37 are provided in opposed side wall portion surfaces of the first and second vibration beams 32a and 32b, the second electrode plate 34b, the third electrode plate 34c and the fourth electrode plate 34d so as to prevent mutual adhesion.

In this case, each asperity 37 is formed into a grid shape continuous horizontally and/or vertically with respect to the surface 311 of the substrate 31.

The asperities 37 will be described in detail later.

The reference numeral 38 designates a shell which forms a part of each vacuum chamber 33.

Next, a manufacturing process of the embodiment in FIGS. 1A-1B will be described.

Figure 2:
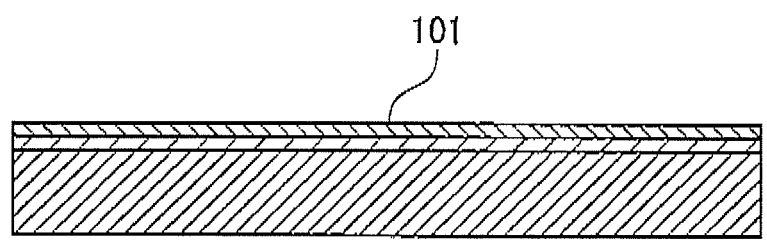
FIGS. 2-15 illustrate a manufacturing process of FIG. 1.

As shown in FIG. 2, an SOI substrate 101 is prepared. For example, an SOI substrate having a 2 μm-thick oxide film as a BOX layer and a 1 μm-thick silicon layer as an active layer is used as the SOI substrate 101.

Figure 3:
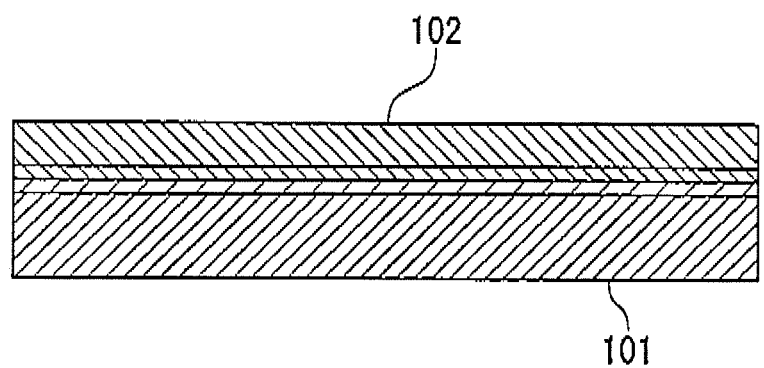

As shown in FIG. 3, a silicon layer 102 containing boron B with high concentration is epitaxially grown on the active layer of the SOI substrate 101 in an epitaxial apparatus.

The silicon layer 102 containing the boron B with high concentration serves as a conductor with a low electric resistance and will become vibration beams, electrodes or lead portions.

In addition, tensile stress remains in the silicon layer 102 containing the boron with high concentration as compared with the substrate portion 101. Thus, tension is generated in each vibration beam portion.

When stress is applied to the vibration beam in its tensional area, the square of the frequency changes in proportion to the stress as shown in the aforementioned expression [Formula 2] so that a characteristic extremely excellent in linearity can be obtained.

On the other hand, a very non-linear characteristic is obtained as operation in a compression stress area. Therefore, the operation of the vibration transducer should be performed in the tensile stress area.

The silicon layer containing the boron with high concentration is grown in the following conditions.

The silicon layer 102 containing the boron with high concentration is grown to be 9 μm thick by epitaxial growth for a predetermined time using dichlorosilane ($SiH_2Cl_2$) as silicon source gas and diborane ($B_2H_6$) as source gas of boron serving as impurities at a growth temperature of 1030° C. in $H_2$ gas. Thus, the total thickness of the silicon layer 102 and the active layer reaches 10 μm.

Figure 4:
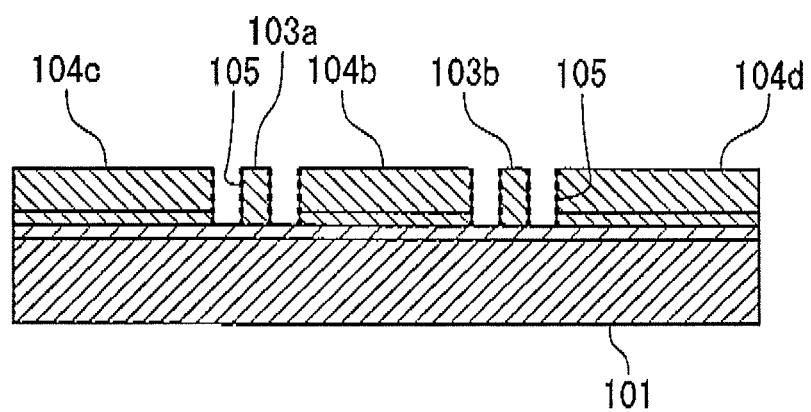

As shown in FIG. 4, a resist is applied to the surface of the silicon layer 102 containing the boron with high concentration and patterned by a stepper apparatus.

The stepper apparatus has a resolution of about 0.3 μm and can form lines and spaces in submicron order.

The contour of vibration beams 103 and the pattern of electrodes 104 are formed by the stepper apparatus.

The total thickness 10 μm of the silicon layer 102 and the active layer formed in FIG. 3 is etched like trenches by a dry etching apparatus.

On this occasion, the step of etching silicon, which step is called a BOSCH process, and the step of depositing CF polymer are performed repeatedly to form pleated asperities 105 on the side wall surfaces of the trenches to be etched.

The etching time and the deposition time are adjusted so that irregularities at least about 0.1 μm high can form horizontal stripes at a pitch of about 0.1 μm to about 1 μm.

The etching is performed till the etching reaches the BOX layer of the SOI wafer 101 to separate the vibration beams 103 and the electrodes 104 from each other structurally.

Figure 5:
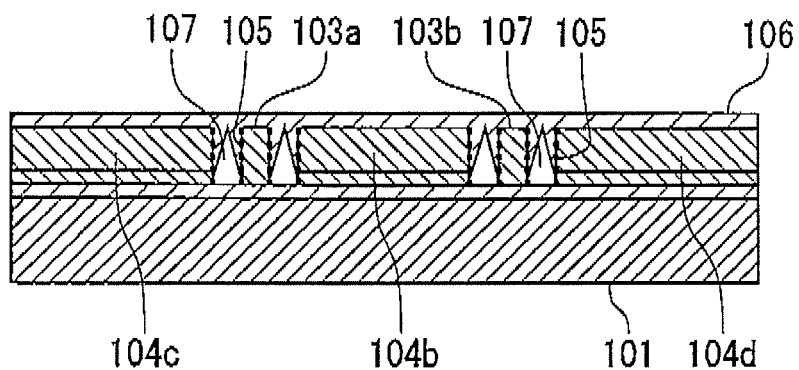

As shown in FIG. 5, the CF polymer is eliminated and the resist is released. Then, the trench structure portions formed in FIG. 4 are filled with an insulating film 106.

For the filling, the opening portions of the trenches are closed by an LP-CVD oxide film using tetraethoxysilane (TEOS) or the insulating film 106 formed by plasma CVD or the like.

As for the LP-CVD oxide film, a TEOS tank is bubbled to introduce nitrogen gas and oxygen gas into TEOS. The TEOS containing the nitrogen gas and the oxygen gas is thermally decomposed in a vacuum at a temperature of 700° C. and at a pressure of 50 Pa so that a silicon oxide film 106 is formed on the silicon substrate.

As for the plasma CVD film, TEOS and oxygen gas are introduced in a vacuum to generate plasma. Thus, a silicon oxide film 106 is formed on the silicon substrate placed on a stage heated to 400° C.

Since a plasma CVD apparatus is poor at step coverage, it is difficult to form the filling oxide film 106 in deepest portions of the trenches so that spaces (voids) 107 are formed in the trenches.

Figure 6:
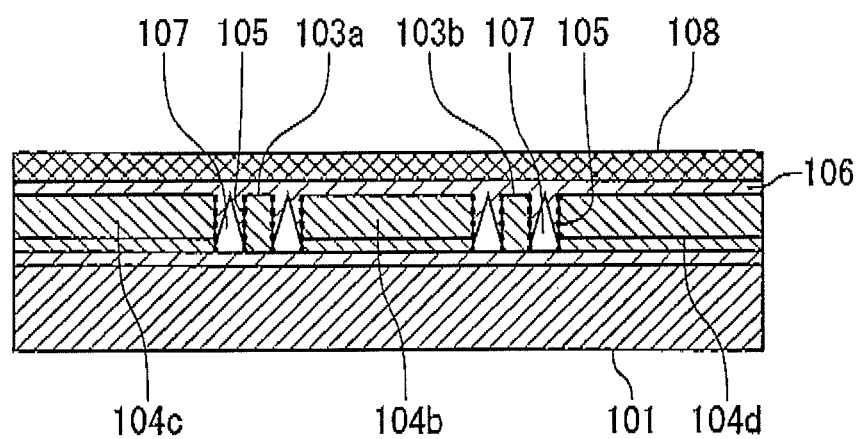

As shown in FIG. 6, a polysilicon film 108 several μm thick is formed on the oxide film 106 closing upper portions of the trenches.

The polysilicon film 108 forms parts of the vacuum chambers 33 for keeping the vibration beams 103 in the vacuum to thereby isolate the vibration beams 103 from silicon oil which transmits pressure.

Figure 7:
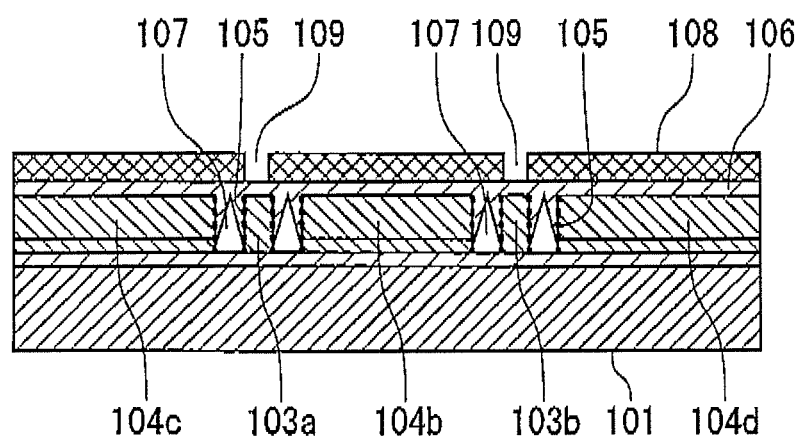

As shown in FIG. 7, the polysilicon film 108 formed in FIG. 6 is partially etched by dry etching to form opening portions 109.

Figure 8:
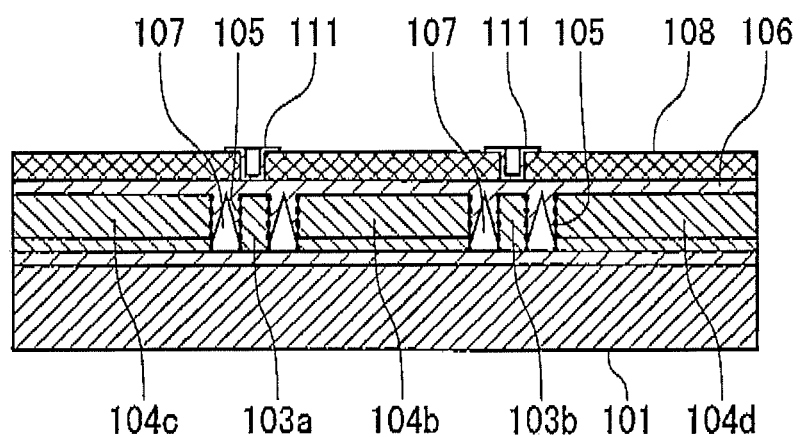

As shown in FIG. 8, a silicon oxide film 111 about 100 nm thick is formed by LP-CVD, and patterned to leave portions near the opening portions 109 and remove the other portions with buffered hydrofluoric acid.

Afterwards, the oxide film 111 will serve as etchant or etching gas introduction holes to remove a sacrifice layer around the vibration beams 103.

Figure 9:
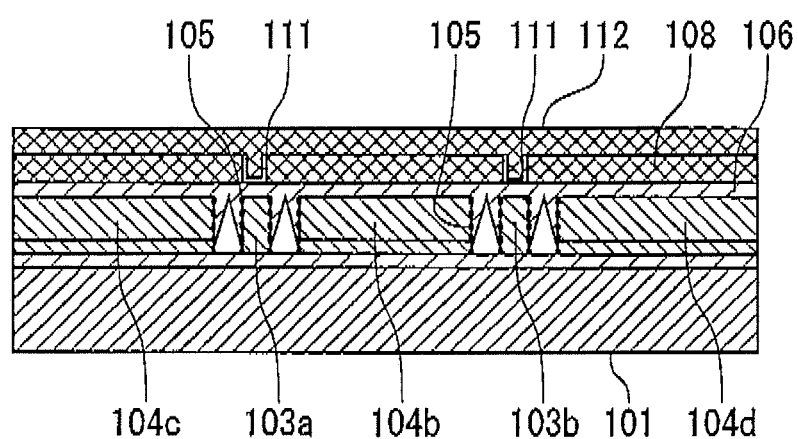

As shown in FIG. 9, a polysilicon layer 112 is further formed so that the opening portions 109 are filled with the polysilicon layer 112.

Figure 10:
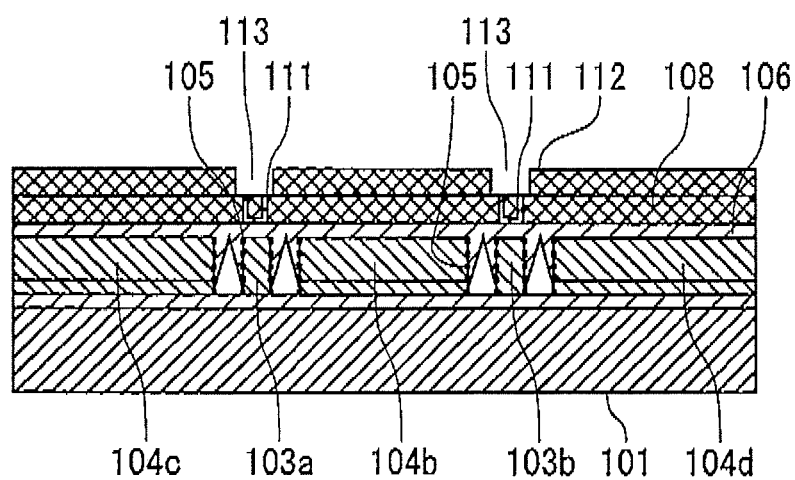

As shown in FIG. 10, holes or slits 113 are made in the surviving portions of the oxide film 111 in FIG. 8 in portions corresponding to the upper portions of the vibration beams 103 so that the oxide film 111 serves as a stopper.

Figure 11:
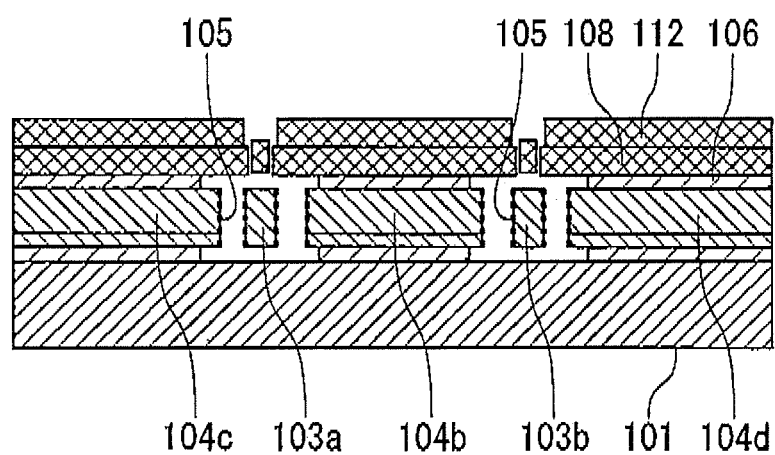

As shown in FIG. 11, the sacrifice layer is removed by HF gas etching or a diluted HF liquid.

Figure 12:
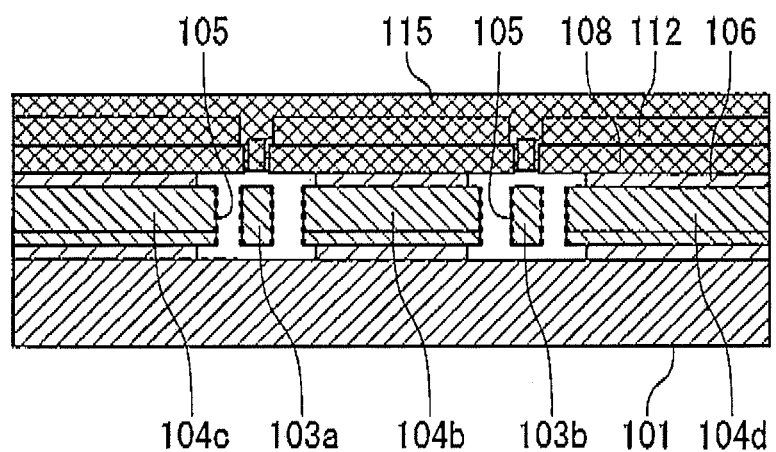

As shown in FIG. 12, vacuum sealing is performed at a low temperature not higher than 900° C. because scallops will disappear if the scallops are exposed into $H_2$ or a vacuum at 900° C. or higher.

Here, vacuum sealing is performed by an LP-CVD polysilicon film 115.

As for the film forming conditions, the LP-CVD polysilicon film 115 is formed using $SiH_4$ gas in a vacuum at a temperature of 590° C. and a pressure of 85 Pa.

The polysilicon film 115 is formed in such a condition that tensile strain is generated in the formed polysilicon film 115 or little residual compressive strain is left.

$SiH_4$ or a mixture of $SiH_4$ and hydrogen is used as silicon source gas.

Figure 13:
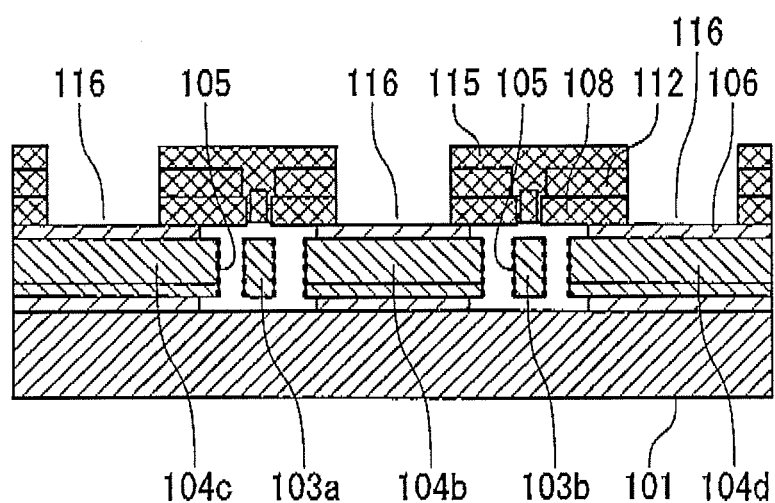

As shown in FIG. 13, holes 116 are formed by etching parts of the polysilicon film where the vacuum chambers are formed, by reactive ion etching (RIE) so that the electrodes 104 can be dug out with the undercoated oxide film 106 used as stoppers.

Figure 14:
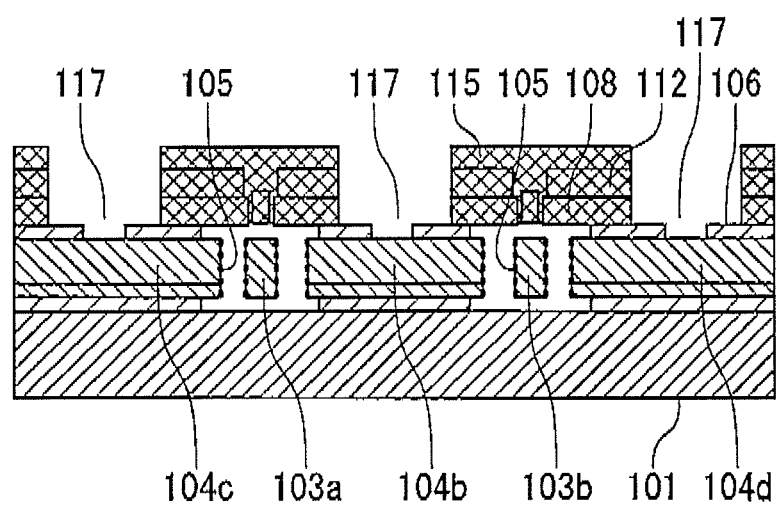

As shown in FIG. 14, the oxide film 106 is bored to form contact holes 117 for making contact with electrodes.

Figure 15:
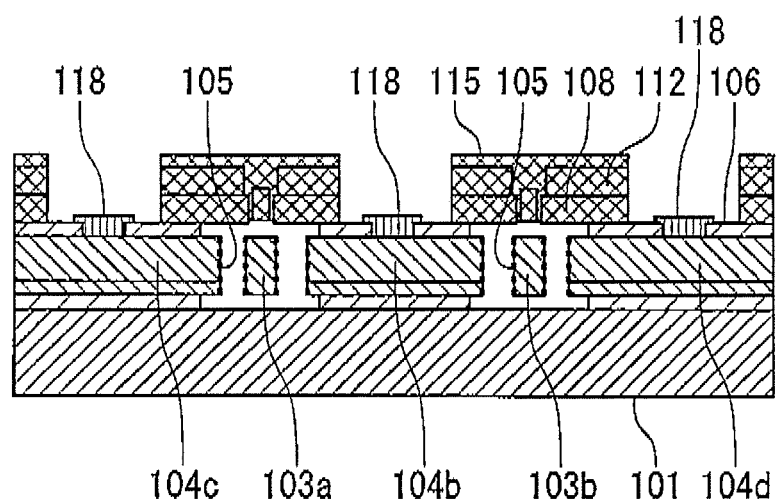

As shown in FIG. 15, a film of aluminum is formed by deposition or sputtering, and patterned to form electrode pads 118. The electrode pads 118 are bonded using gold wires to be connected to an external driver circuit.

In the aforementioned configuration, a method for driving each of the first and second vibration beam 32a and 32b is basically carried out in such a manner that a bias voltage Vb and a driving voltage Vi are applied between the first, second vibration beam 32a, 32b and one of the opposed electrodes so as to generate an electrostatic attractive force F to drive the first, second vibration beam 32a, 32b.

As for a detection method, a DC bias is applied to a capacitor formed between each of the first and second vibration beam 32a and 32b and the other opposed electrode so as to accumulate charges Q=CV in each electrode. When the first, second vibration beam 32a, 32b vibrates to change the capacitance C, the charges Q change and an AC voltage corresponding thereto flows. On this occasion, the first and second vibration beams 32a and 32b are coupled mechanically to form coupled vibration, in which the first and second vibration beams 32a and 32b vibrate at one and the same resonance frequency.

This is amplified and converted into a change of voltage by a differential amplifier or the like and read by a counter. In this manner, the vibration frequency of the first and second vibration beams 32a and 32b can be measured.

As a result, although the related-art example has a lamination structure in which a vibration beam, an excitation electrode, and a vibration detection electrode are built into layers so that a large number of processing steps are required in a manufacturing process in the related-art example, the invention can obtain a vibration transducer in which each vibration beam, each excitation electrode and each vibration detection electrode can be manufactured in one step (one mask) because the vibration beam, the excitation electrode and the vibration detection electrode can be disposed substantially in one and the same plane.

In the lamination type according to the related-art example, it is difficult to roughen the vibration beam or a surface opposed to the vibration beam as a countermeasure against adhesion of the vibration beam and perform processing on the vibration beam and the opposed surface in order to prevent the vibration beam from adhering to the opposed surface. However, in the horizontally vibrating type according to the invention in which each vibration beam, each excitation electrode and each vibration detection electrode can be disposed substantially in one and the same plane, opposite surfaces can be roughened in the same processing step as the vibration beam and an electrode surface opposed thereto are processed. It is therefore possible to obtain a vibration transducer in which adhesion of the vibration beam can be prevented easily and surely.

For example, the roughened surfaces are manufactured by use of scallops occurring due to etching used when side surfaces are processed or by use of irregularities provided in a mask pattern for forming the vibration beams and the electrodes.

When the vibration beams are disposed obliquely, the width of the shell can be made narrower than that in the related-art example. It is therefore possible to obtain a vibration transducer in which the withstanding pressure can be improved when the thickness of the shell is fixed.

To achieve the same withstanding pressure, the film thickness of the shell serving as a pressure bulkhead may be thin. In the case of the lamination vibrating type according to the related-art example, the driving electrode has to be built on the shell side. Therefore, when high pressure is applied, the shell may be deformed to change the distance between the electrode and the vibration beam. Thus, there is a fear that the frequency change characteristic may be nonlinear.

The aspect ratio of the shape of each vibration beam also affects the resonance frequencies of horizontal vibration and vertical vibration. When the resonance frequency of a vibration mode of a vibration beam used for measurement of pressure causes interference with the resonance frequency of another vibration mode, the resonance frequencies are locked in each other so that hysteresis occurs in frequency measurement. Thus, an error is generated. In order to avoid the error, a horizontal vibration mode used for measurement of the vibration beam must have the lowest frequency (primary mode), and a vertical vibration mode must be a high-order vibration mode.

As for the aspect ratio of the shape of the vibration beam, the length must be at least three times as long as the transversal width in order to achieve the aforementioned condition. It is also important to dispose the vibration beam oblongly in this manner in order to improve the measuring accuracy.

Further, the shape of the vibration beam can be processed desirably two-dimensionally. It is therefore possible to easily manufacture a vibration beam having a complicated shape or a vibration beam effective in enhancing the vibration stability.

Here, description will be made on a vibrator having a dual tuning fork structure in which vibration beam portions of two tuning forks are opposed to and coupled with each other.

In the dual tuning fork structure, two vibration beams 32a and 32b vibrate horizontally with respect to a substrate 31 and concurrently to be opposed to each other or to leave each other. Thus, forces generated by the vibrations of the vibration beams 32a and 32b cancel each other so that the force transmitted to the substrate 31 fixed to the vibration beams 32a and 32b becomes smaller than the case where one vibration beam vibrates alone.

For this reason, the vibration energy hardly leaks from the fixed ends of the vibration beams 32a and 32b toward the substrate. Thus, a Q value indicating the sharpness of vibration in each vibration beam 32a, 32b increases.

In addition, when the vibration beams 32a and 32b are manufactured above a diaphragm to form a pressure gauge, the resonance frequency of the diaphragm may agree with the resonance frequency of the vibration beams 32a and 32b. In such a case, when the leakage of the vibration energy of the vibration beams 32a and 32b is low, interference of the vibration beams 32a and 32b with the diaphragm due to resonance phenomena is so small that it is possible to suppress the lock-in of the resonance frequency of the vibration beams 32a and 32b or the variation of amplitude thereof.

Each asperity 37 is formed into a grid shape continuous horizontally and/or vertically with respect to a surface of the substrate 31 so that the contact area at the time of contact can be reduced. Accordingly, there is an effect that each vibration beam can be prevented from adhering to an electrode opposed thereto with a narrow gap. The length of the vibration beam is at least 100 times as long as the thickness of the vibration beam with respect to the vibrating direction of the vibration beam. Thus, it is possible to form a vibration beam with high strain sensitivity.

Figure 16:
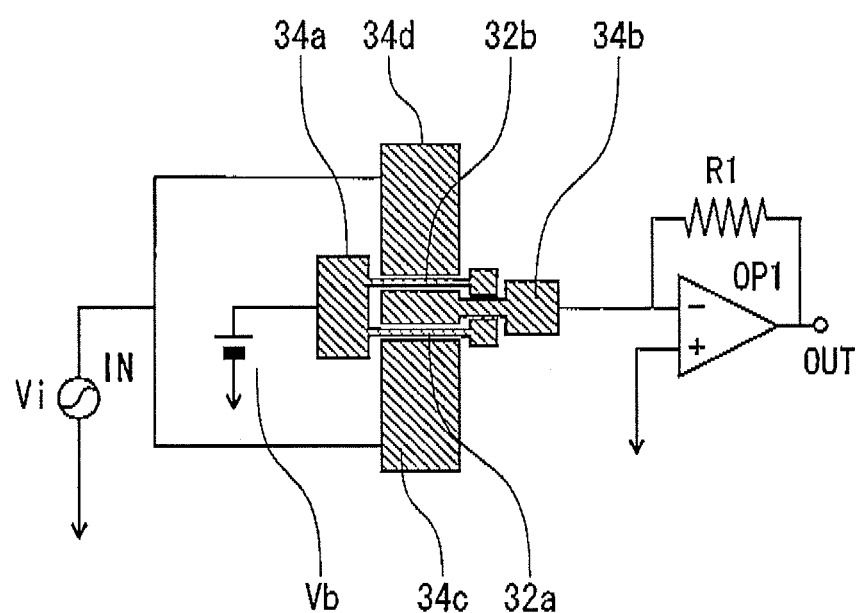
FIG. 16 shows a specific circuit diagram of FIG. 1.

FIG. 16 shows a specific circuit diagram of the vibration transducer according to the invention.

In FIG. 16, Vb designates a bias voltage (constant voltage), Vi designates a driving voltage (AC), R1 designates a resistance, and OP1 designates an operational amplifier.

The bias voltage Vb is applied to the first electrode plate 34a, the driving voltage Vi is applied to the third electrode plate 34c and the fourth electrode plate 34d. A signal corresponding to the vibration frequency of the first vibration beam 32a and the second vibration beam 32b is extracted from the second electrode plate 34b.

That is, in this case, each of the third electrode plate 34c and the fourth electrode plate 34d is used as an excitation electrode, and the second electrode plate 34b is used as a detection electrode.

As a result, in a four-terminal device, a vibration beam and an electrode connected thereto serve as a guard electrode so that an excitation electrode and a detection electrode can be separated from each other. It is therefore possible to obtain a vibration transducer in which crosstalk of an excitation signal intruding into a detection circuit is suppressed so that the SN ratio is improved.

Figure 17:
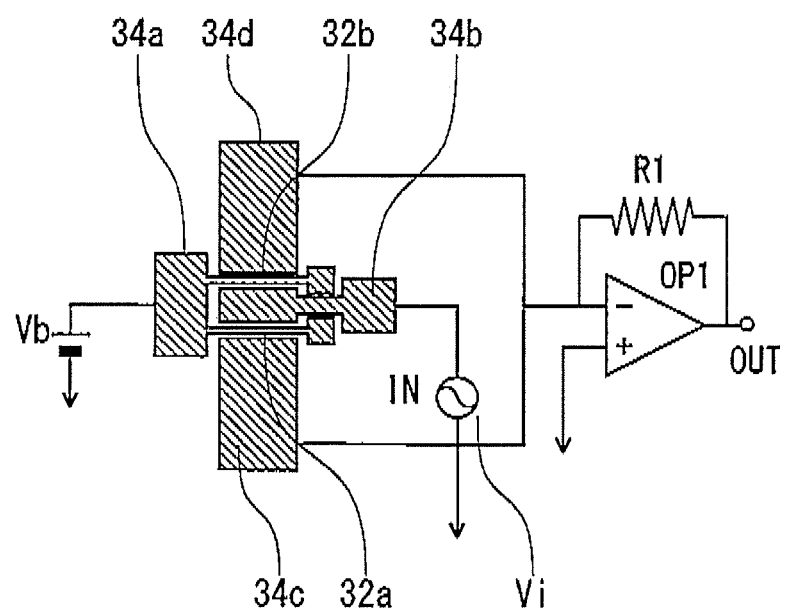
FIG. 17 shows another specific circuit diagram of FIG. 1.

FIG. 17 shows a specific circuit diagram of the vibration transducer according to the invention.

In FIG. 17, Vb designates a bias voltage (constant voltage), Vi designates a driving voltage (AC), R1 designates a resistance, and OP1 designates an operational amplifier.

The bias voltage Vb is applied to the first electrode plate 34a, and the driving voltage Vi is applied to the second electrode plate 34b. A signal corresponding to the vibration frequency of the first vibration beam 32a and the second vibration beam 32b is extracted from the third electrode plate 34c and the fourth electrode plate 34d.

That is, in this case, the second electrode plate 34b is used as an excitation electrode, and each of the third electrode plate 34c and the fourth electrode plate 34d is used as a detection electrode.

As a result, in a four-terminal device, a vibration beam and an electrode connected thereto serve as a guard electrode so that an excitation electrode and a detection electrode can be separated from each other. It is therefore possible to obtain a vibration transducer in which crosstalk of an excitation signal intruding into a detection circuit is suppressed so that the SN ratio is improved.

Figure 18:
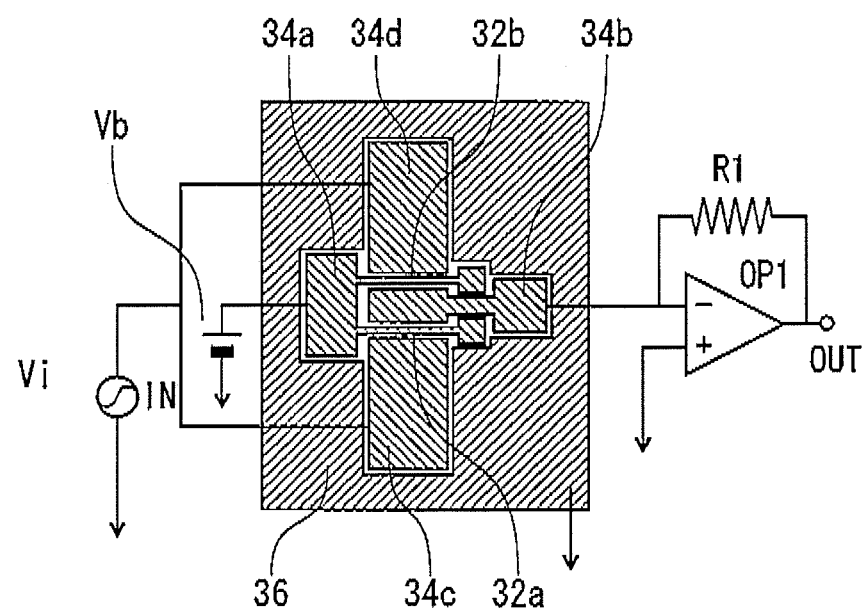
FIG. 18 shows another specific circuit diagram of FIG. 1.

FIG. 18 shows another specific circuit diagram of the vibration transducer according to the invention.

In FIG. 18, Vb designates a bias voltage (constant voltage), Vi designates a driving voltage (AC), R1 designates a resistance, and OP1 designates an operational amplifier.

The bias voltage Vb is applied to the first electrode plate 34a, and the driving voltage Vi is applied to the third electrode plate 34c and the fourth electrode plate 34d. A signal corresponding to the vibration frequency of the first vibration beam 32a and the second vibration beam 32b is extracted from the second electrode plate 34b.

That is, in this case, each of the third electrode plate 34c and the fourth electrode plate 34d is used as an excitation electrode, and the second electrode plate 34b is used as a detection electrode.

The guard electrode plate 36 is provided to surround the first electrode plate 34a, the second electrode plate 34b, the third electrode plate 34c and the fourth electrode plate 34d.

As a result, since the guard electrode plate 36 is provided in one plane in parallel with the surface of the substrate 31 excluding the first, second, third and fourth electrode plates 34a, 34b, 34c and 34d so as to surround the electrodes in order to prevent crosstalk among the electrodes, it is possible to obtain a vibration transducer in which crosstalk can be further reduced when the guard electrode plate 36 is grounded.

Figure 19:
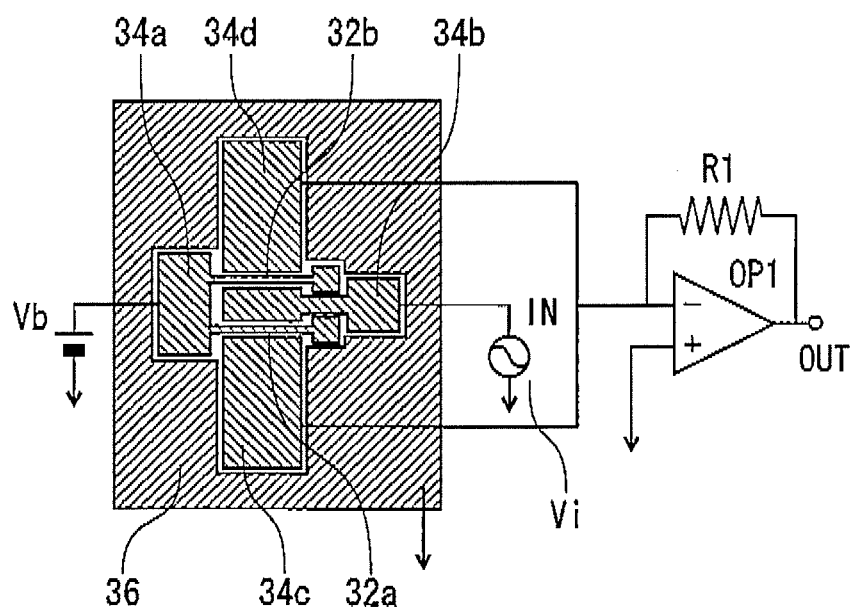
FIG. 19 shows another specific circuit diagram of FIG. 1.

FIG. 19 shows another specific circuit diagram of the vibration transducer according to the invention.

In this embodiment, the excitation electrode and the detection electrode in the embodiment of FIG. 18 are replaced by each other and connected to each other.

That is, the second electrode plate 34b is used as an excitation electrode, and each of the third electrode plate 34c and the fourth electrode plate 34d is used as a detection electrode.

Figure 20:
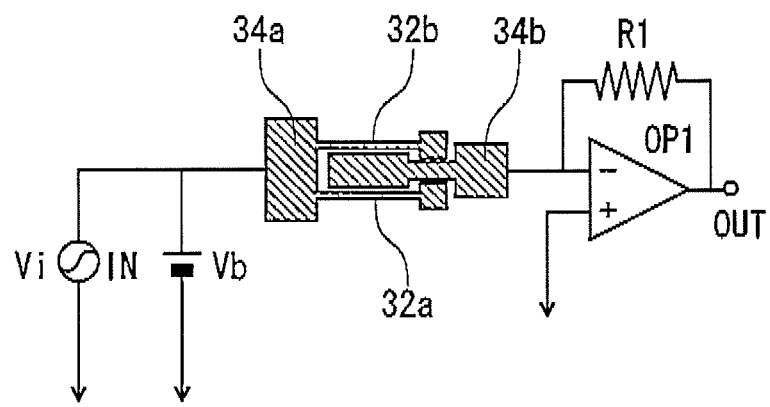
FIG. 20 shows another specific circuit diagram of FIG. 1.

FIG. 20 shows another specific circuit diagram of the vibration transducer according to the invention.

In FIG. 20, Vb designates a bias voltage (constant voltage), Vi designates a driving voltage (AC), R1 designates a resistance, and OP1 designates an operational amplifier.

The driving voltage (AC) Vi and the bias voltage Vb are applied to the first electrode plate 34a. A signal corresponding to the vibration frequency of the first vibration beam 32a and the second vibration beam 32b is extracted from the second electrode plate 34b.

That is, in this case, the first electrode plate 34a is used as an excitation electrode, and the second electrode plate 34b is used as a detection electrode.

As a result, in a two-terminal device, the number of lead terminals can be reduced, and the number of hermetic pins can be reduced. It is therefore possible to obtain a vibration transducer whose package can be miniaturized.

Figure 21:
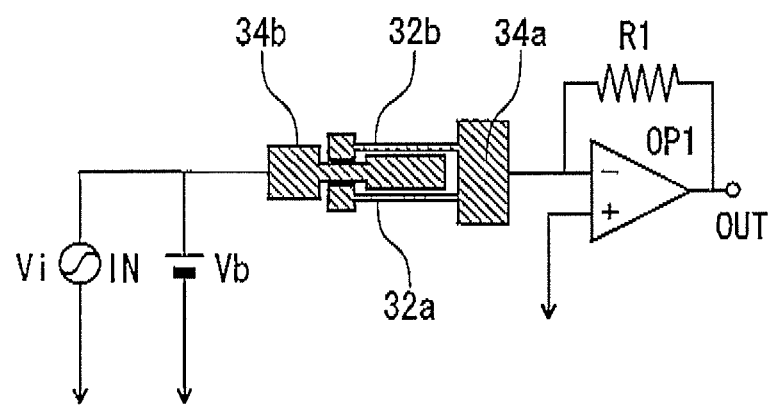
FIG. 21 shows another specific circuit diagram of FIG. 1.

FIG. 21 shows another specific circuit diagram of the vibration transducer according to the invention.

In this embodiment, the excitation electrode and the detection electrode in the embodiment of FIG. 20 are replaced by each other and connected to each other.

That is, the second electrode plate 34b is used as an excitation electrode, and the first electrode plate 34a is used as a detection electrode.

Next, detailed description will be made on formation of each asperity 37.

The asperity 37 may be formed using scallops occurring due to etching used when side surfaces of the first vibration beam 32a, the second vibration beam 32b and the electrodes 34a, 34b, 34c and 34d are processed, as shown in FIG. 4. Alternatively, the asperity 37 may be formed using a mask pattern with microscopic protrusions at the time of etching.

For example, a Bosch process is used for producing scallops.

The Bosch process is an etching method in which etching and side wall protection are performed repeatedly. Etching with a high aspect ratio can be achieved by the Bosch process.

Figure 22A:
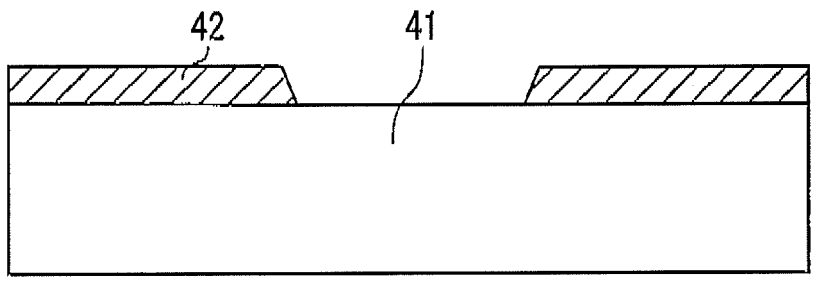
FIGS. 22A to 22E illustrate a process of forming asperities 37 of FIG. 1.
Figure 22B:
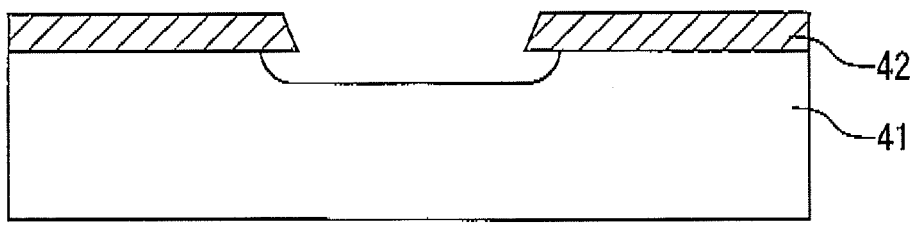

As shown in FIGS. 22A-22B, the following two steps are repeated in the process.

The reference numeral 41 represents a silicon substrate, and the reference numeral 42 represents a mask pattern.

(1) Etching Step

Figure 22C:
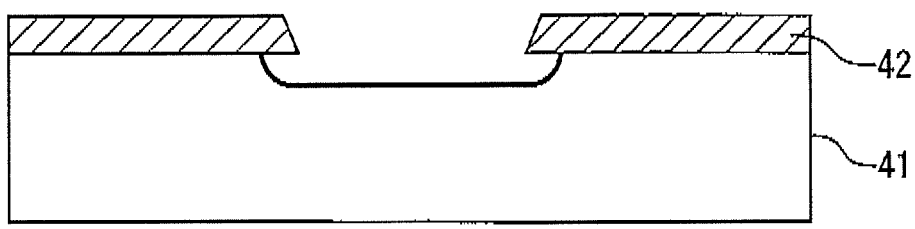
Figure 22D:
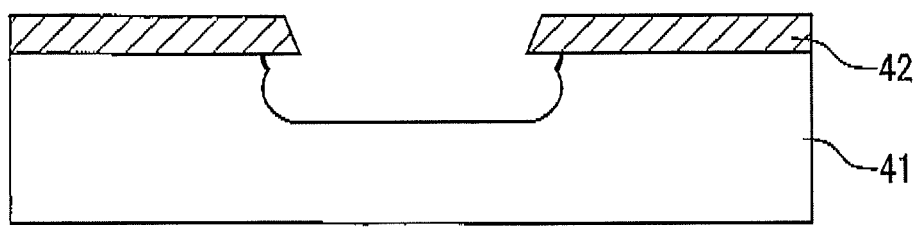

As shown in FIGS. 22B and 22D, isotropic etching is performed chiefly using sulfur hexafluoride ($SF_6$).

A passivating film may be attached to the bottoms of etched pits. In this case, this step also serves for eliminating the passivating film in the bottoms.

(2) Protection Step

Figure 22E:
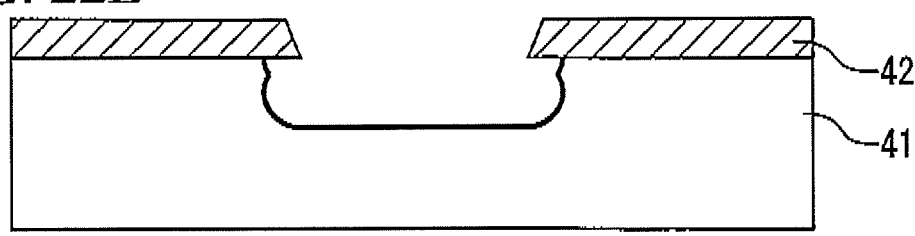

As shown in FIGS. 22C and 22E, a CF-based film is deposited on the side wall using fluorocarbon gas (e.g. $C_4F_8$) to protect the side wall. Thus, transversal etching is suppressed.

The etching step and the protection step are repeated so that microscopic folded irregularities called scallops are formed.

Times for the etching step and the protection step are adjusted so that the degree of irregularities can be controlled.

Figure 23:
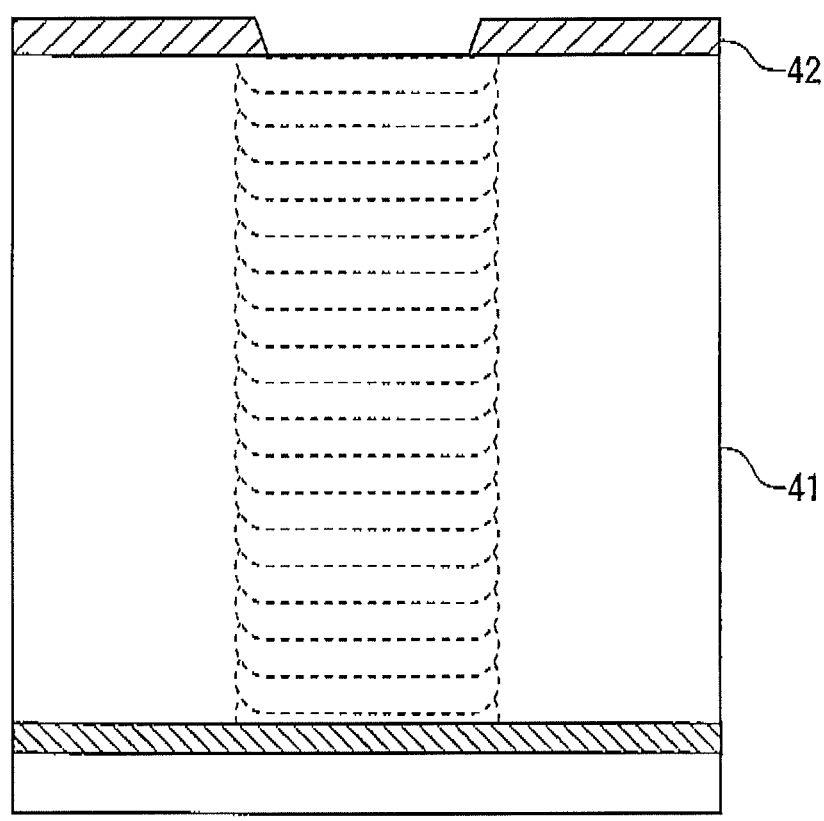
FIG. 23 shows a completed state of the asperities 37 of FIG. 1.
Figure 24:
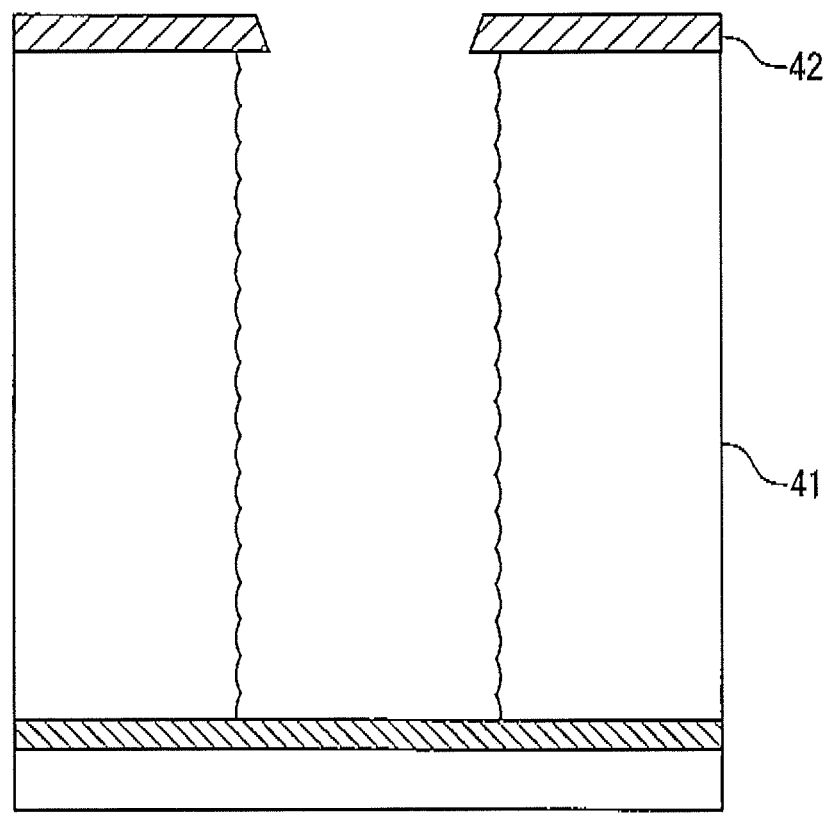
FIG. 24 is a sectional view of FIG. 22.

FIG. 23 is a view showing the etching in progress and FIG. 24 is a completion view of FIG. 23.

FIGS. 25A-25B, 26A-26C and 27A-27C show embodiments of the asperity 37 formed by combination of scallops and a flat mask pattern with microscopic protrusions.

Figure 25A:
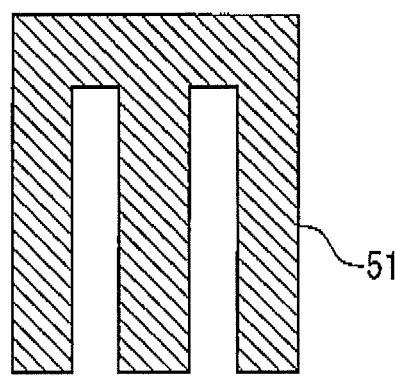
FIGS. 25A to 27C show examples of the asperities 37 of FIG. 1.
Figure 25B:
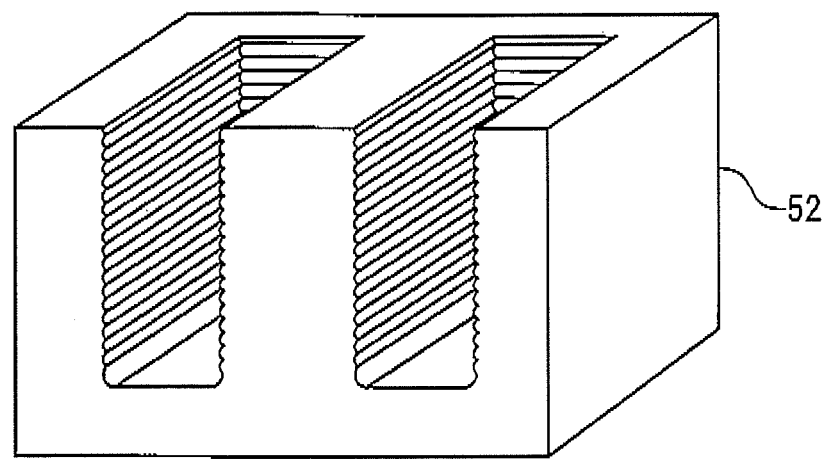

FIG. 25B shows, an example in which scallops are formed in a silicon substrate 52 using a mask pattern 51 as shown in FIG. 25A.

Figure 26A:
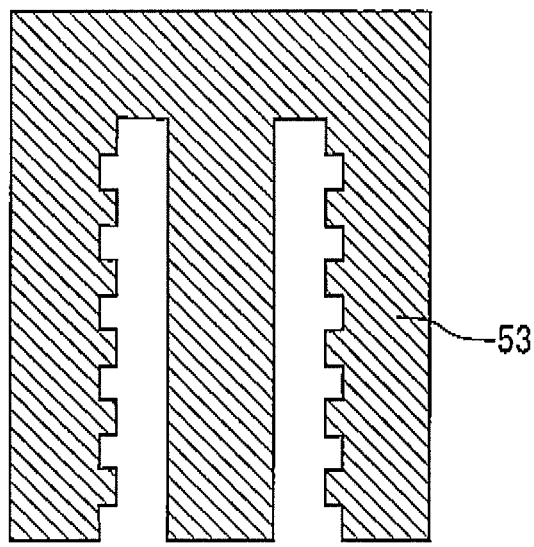
Figure 26B:
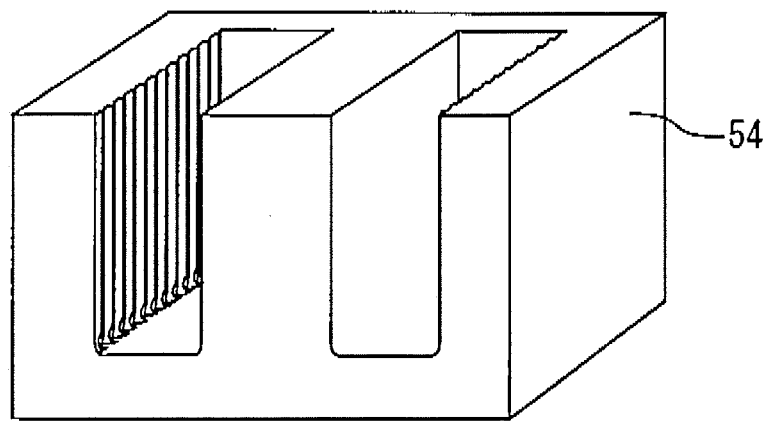

FIG. 26B shows an example in which normal anisotropic etching is performed on a silicon substrate 54 using a mask pattern 53 as shown in FIG. 26A.

Figure 26C:
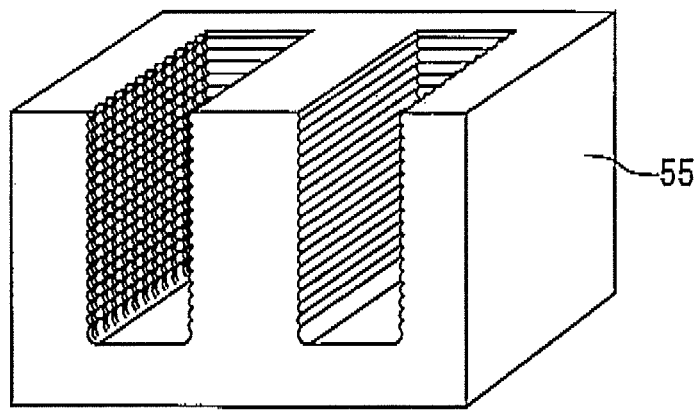

FIG. 26C shows an example in which etching is performed on a silicon substrate 55 by the Bosch process using the mask pattern 53 as shown in FIG. 26A, so as to form scallops.

Figure 27A:
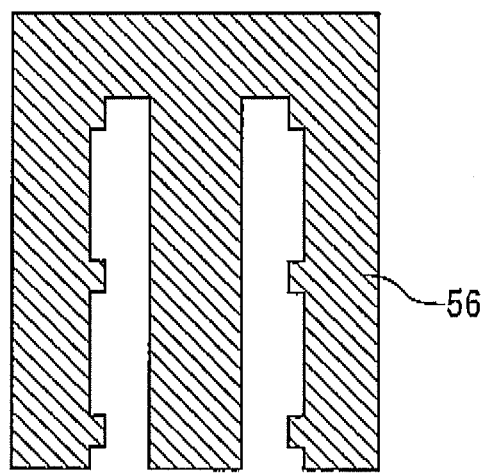
Figure 27B:
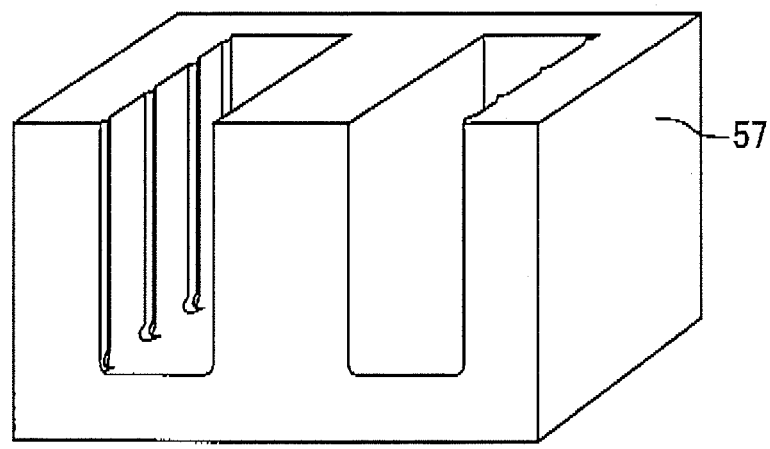

FIG. 27B shows an example in which normal anisotropic etching is performed on a silicon substrate 57 using a mask pattern 56 as shown in FIG. 27A.

Figure 27C:
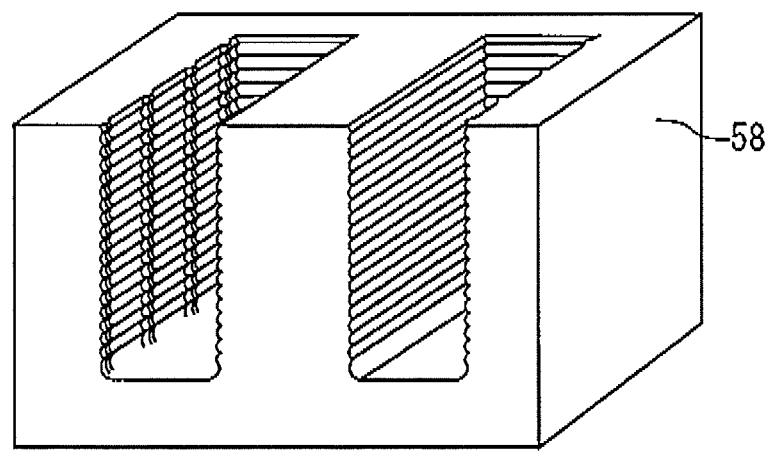

FIG. 27C shows an example in which etching is performed on a silicon substrate 58 by the Bosch process using the mask pattern 56 as shown in FIG. 27A, so as to form scallops.

Next, description will be made on the relationship between the vibration beam 32 and the shell 38 according to the invention.

Figure 28A:
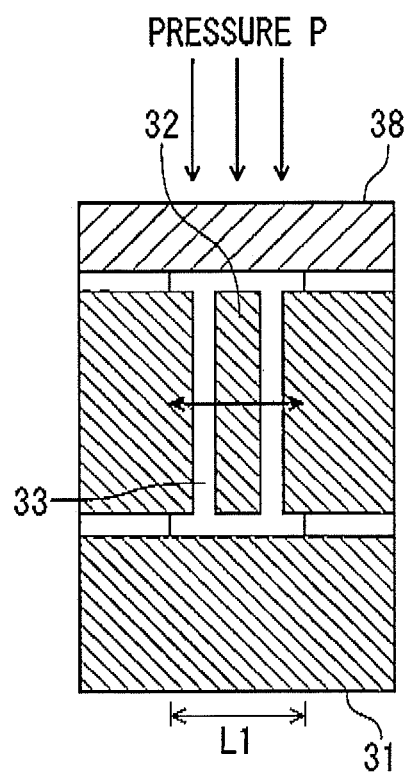
FIG. 28A is a schematic view showing a relationship between a vibration beam and a shell of the embodiment of the invention.
Figure 28B:
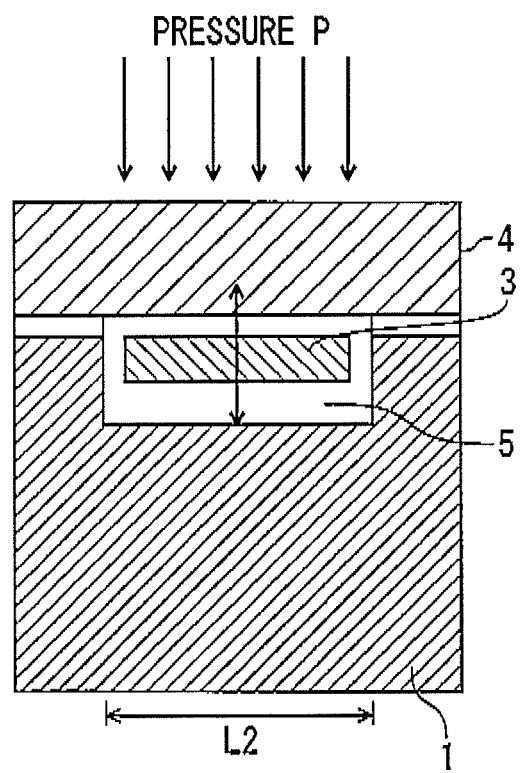
FIG. 28B is a schematic view showing a relationship between the vibration beam and the shell in a related-art vibration transducer shown in FIG. 29.

FIG. 28A schematically shows the relationship between the vibration beam 32a, 32b and the shell 38 according to the invention. FIG. 28B schematically shows the relationship between the vibration beam 3 and the shell 4 in the related-art example of FIG. 29.

The vibration beam 32a, 32b has a sectional shape in which the sectional thickness in a direction perpendicular to the surface of the substrate 31 is longer than that in a direction parallel to the surface of the substrate 31. That is, the vibration beam 32a, 32b is disposed oblongly. Thus, a width L1 of the shell 38 can be also narrowed, for example, to about a quarter of a width L2 in the related-art example of FIG. 29. Therefore, the withstanding pressure can be improved to about four times when the shell thickness is fixed.

To achieve the same withstanding pressure, the film thickness of the shell 38 may be reduced to about a quarter.

P designates pressure.

In the case of the vertically vibrating type in the related-art example of FIG. 29, the driving electrode has to be built on the shell 4 side. When high pressure is applied, the shell 4 may be deformed to change the distance between the electrode and the vibration beam so that the electrostatic attraction force acting on the vibration beam is affected to make the frequency change characteristic nonlinear.

When no magnet is used, the vibration transducer can be used as a strain gauge, which is another application than a pressure sensor.

In addition, various vibration beam shapes can be produced by a simple method of changing the mask pattern in one and the same manufacturing process. Therefore, the process can be also applied as a manufacturing process for a highly sensitive accelerometer or a highly sensitive vibrating gyroscope.

Particular preferred embodiments have been described above to explain and illustrate the invention. Therefore, the invention is not limited to the above embodiments and encompasses many changes and modification as long as they do not depart from the essential features of the invention.

What is claimed is:

1. A vibration transducer comprising:
    a silicon single crystal substrate;
    vibration beams provided on the silicon single crystal substrate;

a shell made of a silicon material, surrounding the vibration beams to keep a gap around the vibration beams, and forming vacuum chambers together with the substrate;

an exciting module configured to excite the vibration beams; and a vibration detection module configured to detect vibrations of the vibration beams;

wherein the vibration beams include first and second silicon single crystal vibration beams provided in the vacuum chambers, each of which has a sectional shape with a longer sectional thickness in a direction perpendicular to a surface of the substrate than a sectional thickness in a direction parallel to the surface of the substrate, and which are provided in parallel with the substrate and in parallel with each other, and wherein the vibration transducer further comprises:

a plate-like first electrode plate provided in parallel with the surface of the substrate and connected to one end of each of the first and second vibration beams;

a second electrode plate provided in parallel with the surface of the substrate and between the first and second vibration beams;

plate-like third and fourth electrode plates provided on opposite sides of the first and second vibration beams so that the first and second vibration beams are put between the third and fourth electrode plates, forming one plane in parallel with the surface of the substrate together with the first and second vibration beams and the first and second electrode plates; and asperities provided in opposed side wall portion surfaces of the vibration beams and the second, third and fourth electrode plates so as to prevent the vibrating beams from adhering to the second, third and fourth electrode plates.

2. The vibration transducer according to claim 1, wherein:
each of the asperities is formed into a grid shape continuous horizontally and/or vertically with respect to the surface of the substrate.

3. The vibration transducer according to claim 1, wherein:
the first electrode plate is used as a bias voltage electrode plate for the vibration beams and the second electrode plate is used as a vibration detection electrode plate for the vibration beams; and
the third and fourth electrode plates are used as excitation electrode plates for exciting the vibration beams.

4. The vibration transducer according to claim 1, wherein:
the first electrode plate is used as a bias voltage electrode plate for the vibration beams and the second electrode plate is used as an excitation electrode plate for exciting the vibration beams; and
the third and fourth electrode plates are used as vibration detection electrode plates for detecting vibrations of the vibration beams.

5. The vibration transducer according to claim 1, wherein:
one of the first and second electrode plates is used as an excitation electrode and a bias voltage electrode and the other is used as a vibration detection electrode.

6. The vibration transducer according to claim 1, further comprising:
a guard electrode plate provided in one plane in parallel with the surface of the substrate excluding the first, second, third and fourth electrode plates so as to prevent crosstalk among respective electrodes.

7. The vibration transducer according to claim 1, wherein:
the vibration beams includes both-ends fixed beams.

\* \* \* \* \*